(12) United States Patent
Thompson et al.

(10) Patent No.: US 10,795,844 B2
(45) Date of Patent: Oct. 6, 2020

(54) MULTICORE BUS ARCHITECTURE WITH NON-BLOCKING HIGH PERFORMANCE TRANSACTION CREDIT SYSTEM

(71) Applicant: TEXAS INSTRUMENTS INCORPORATED, Dallas, TX (US)

(72) Inventors: David M. Thompson, Dallas, TX (US); Timothy D. Anderson, University Park, TX (US); Joseph R. M. Zbiciak, San Jose, TX (US); Abhijeet A. Chachad, Plano, TX (US); Kai Chirca, Dallas, TX (US); Matthew D. Pierson, Murphy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/430,748

(22) Filed: Jun. 4, 2019

(65) Prior Publication Data
US 2019/0354500 A1 Nov. 21, 2019

Related U.S. Application Data

(63) Continuation of application No. 15/903,183, filed on Feb. 23, 2018, now Pat. No. 10,311,007, which is a
(Continued)

(51) Int. Cl.
*G06F 13/40* (2006.01)
*G06F 13/42* (2006.01)
(Continued)

(52) U.S. Cl.
CPC .......... *G06F 13/404* (2013.01); *G06F 13/364* (2013.01); *G06F 13/42* (2013.01);
(Continued)

(58) Field of Classification Search
None
See application file for complete search history.

(56) References Cited

U.S. PATENT DOCUMENTS

| 5,432,824 A | 7/1995 | Zheng |
| 5,453,982 A | 9/1995 | Pennington |

(Continued)

FOREIGN PATENT DOCUMENTS

CN 101753388 A 6/2010

OTHER PUBLICATIONS

Search Report P.R.C. (China) for Chinese Patent Application No. 2015800581267 dated Aug. 19, 2019.
(Continued)

*Primary Examiner* — Steven G Snyder
(74) *Attorney, Agent, or Firm* — Brian D. Graham; Charles A. Brill; Frank D. Cimino

(57) ABSTRACT

This invention is a bus communication protocol. A master device stores bus credits. The master device may transmit a bus transaction only if it holds sufficient number and type of bus credits. Upon transmission, the master device decrements the number of stored bus credits. The bus credits correspond to resources on a slave device for receiving bus transactions. The slave device must receive the bus transaction if accompanied by the proper credits. The slave device services the transaction. The slave device then transmits a credit return. The master device adds the corresponding number and types of credits to the stored amount. The slave device is ready to accept another bus transaction and the master device is re-enabled to initiate the bus transaction. In many types of interactions a bus agent may act as both master and slave depending upon the state of the process.

20 Claims, 13 Drawing Sheets

Related U.S. Application Data continuation of application No. 14/530,203, filed on Oct. 31, 2014, now Pat. No. 9,904,645.

(51) Int. Cl.
*H04L 12/801* (2013.01)
*G06F 13/364* (2006.01)
*H04L 12/819* (2013.01)

(52) U.S. Cl.
CPC .......... *G06F 13/4282* (2013.01); *H04L 47/10* (2013.01); *H04L 47/215* (2013.01); *H04L 47/39* (2013.01)

(56) References Cited

U.S. PATENT DOCUMENTS

| | | | |
|---|---|---|---|
| 5,483,526 A | | 1/1996 | Ben-Nun |
| 5,511,076 A | | 4/1996 | Ramakrishnan |
| 5,515,359 A | | 5/1996 | Zheng |
| 5,633,867 A | | 5/1997 | Ben-Nun |
| 5,737,535 A | | 4/1998 | Bagley |
| 5,825,748 A | | 10/1998 | Barkey |
| 6,044,406 A | | 3/2000 | Barkey |
| 6,594,701 B1 * | | 7/2003 | Forin .................. G06F 12/1081 709/232 |
| 6,760,793 B2 | | 7/2004 | Kelley |
| 7,103,672 B1 | | 9/2006 | Sharma |
| 7,136,954 B2 | | 11/2006 | Check et al. |
| 7,165,094 B2 | | 1/2007 | Weber et al. |
| 7,277,974 B2 | | 10/2007 | Check et al. |
| 7,310,309 B1 | | 12/2007 | Xu |
| 7,453,878 B1 * | | 11/2008 | Martin .................... H04L 45/24 370/394 |
| 7,480,730 B2 | | 1/2009 | Stuart et al. |
| 7,536,473 B2 | | 5/2009 | Ajanovic |
| 7,647,435 B2 | | 1/2010 | Check et al. |
| 7,675,929 B1 * | | 3/2010 | Davis .................... H04L 47/10 370/235.1 |
| 7,911,952 B1 | | 3/2011 | Nygreen et al. |
| 8,195,858 B1 | | 6/2012 | Keil |
| 8,295,293 B1 | | 10/2012 | Brown |
| 8,307,136 B2 | | 11/2012 | Feiereisel et al. |
| 8,321,618 B1 | | 11/2012 | Keil |
| 8,391,302 B1 | | 3/2013 | Kommidi |
| 8,924,612 B2 * | | 12/2014 | Maji .................... G06F 13/4291 710/110 |
| 9,075,929 B2 | | 7/2015 | Lakshmanamurthy et al. |
| 9,565,106 B2 * | | 2/2017 | Ajanovic ............. G06F 13/4221 |
| 9,565,122 B2 | | 2/2017 | Harrand et al. |
| 9,736,071 B2 * | | 8/2017 | Ajanovic .............. G06F 13/124 |
| 9,755,983 B1 | | 9/2017 | Swarzentruber |
| 9,860,173 B2 * | | 1/2018 | Ajanovic .............. G06F 13/124 |
| 9,954,792 B2 * | | 4/2018 | Theobald ............ H04L 12/4641 |
| 10,311,007 B2 * | | 6/2019 | Thompson .......... G06F 13/4282 |
| 2003/0133463 A1 | | 7/2003 | Lacey |
| 2003/0158992 A1 | | 8/2003 | Ajanovic |
| 2005/0063305 A1 * | | 3/2005 | Wise ....................... H04L 49/90 370/235 |
| 2005/0063308 A1 * | | 3/2005 | Wise ....................... H04L 47/39 370/236 |
| 2005/0228900 A1 | | 10/2005 | Stuart et al. |
| 2006/0053258 A1 | | 3/2006 | Liu et al. |
| 2006/0179182 A1 | | 8/2006 | Chadha |
| 2007/0067545 A1 | | 3/2007 | Check et al. |
| 2007/0233918 A1 | | 10/2007 | Check et al. |
| 2009/0003216 A1 * | | 1/2009 | Radunovic .............. H04L 47/10 370/237 |
| 2010/0061374 A1 * | | 3/2010 | Hadas ..................... H04L 47/39 370/394 |
| 2013/0117181 A1 | | 5/2013 | Isaacson et al. |
| 2014/0301205 A1 | | 10/2014 | Harrand et al. |
| 2015/0113189 A1 | | 4/2015 | Lakshmanamurthy |
| 2015/0149809 A1 | | 5/2015 | Feero |
| 2016/0139807 A1 | | 5/2016 | Lesartre |
| 2020/0076742 A1 * | | 3/2020 | McDonald .............. H04L 47/30 |

OTHER PUBLICATIONS

PCI Express Base Specification Revision 3.0, Nov. 10, 2010.
H.T Kung, "Traffic Management for High-Speed Networks", 1997, pp. 4-13.
H.T. Kung, et al., "Credit-Based Flow Control for ATM Networks", IEEE Network Magazine, Mar. 1995.
Manolis Katevenis, "Buffer Requirements of Credit-Based Flow Control when a Minimum Draining Rate is Guaranteed", HPCS '97 (4th IEEE Workshop Arch. Impl. High Perf. Communication Subsystems), Chalkidiki, Greece, Jun. 1997.
Nicola Concer et al., "The Connection-then-Credit Flow Control Protocol for Heterogeneous Multicore Systems-on-Chip", IEEE Transactions on Computer-Aided Design of Integrated Circuits and Systems, vol. 29, No. 6, Jun. 2010.

* cited by examiner

MULTICORE BUS ARCHITECTURE WITH NON-BLOCKING HIGH PERFORMANCE TRANSACTION CREDIT SYSTEM

CROSS-REFERENCE TO RELATED APPLICATION(S)

This application is a continuation of and claims priority to U.S. patent application Ser. No. 15/903,183 filed on Feb. 23, 2018, which is a continuation of and claims priority to U.S. patent application Ser. No. 14/530,203, filed on Oct. 31, 2014, all of which are incorporated herein by reference.

TECHNICAL FIELD

The technical field of this invention is digital data processing and more specifically data busses between multiple CPU cores.

BACKGROUND

Traditional bus protocols rely on a communication handshake to transmit a transaction between master and slave. A typical handshake takes the following form. The master places a transaction on the bus and the master asserts a command request signal. The transaction remains on the bus, preventing other transactions from being transmitted, until the slave asserts a command acknowledge signal indicating the transaction has been received. After processing is complete, the slave may optionally place a response on a separate bus and assert a response request. The response remains on the bus, preventing other responses from being transmitted, until the master asserts a response acknowledge signal indicating the response has been received.

This traditional bus communication handshake suffers from a performance loss due to the following factors. Transactions such as commands or responses may on the bus for multiple cycles when a request signal is asserted waiting for an acknowledge signal. This wait prevents other transactions from utilizing the bus. This reduces the number of transactions transmitted during the time period and reduces communication performance. This handshake requires a two way communication in order to transmit a transaction: a request signal from the transaction sender; and acknowledge signal from the transaction recipient. These two signals typically are in different cycles adding to the latency of single transaction processing.

Typical communication protocols transmit read, write, and coherence transactions on separate physical channels. Commands and responses are also typically transmitted on separate channels. As address and data widths increase, this results in a very large number of physical wires that must be routed during physical design. The resulting wire congestion can result in increased area, power consumption and lengthened design schedule. This wiring congestion can also result in decreased performance if the area increase leads to the insertion of additional pipeline stages.

SUMMARY

This invention is a bus communication protocol. A master device may initiate communications. Each master device stores a number of bus credits. The master device may transmit a bus transaction only if it stores a number and type of bus credits corresponding to the transaction. If the master device hold sufficient bus credits it may transmit a bus transaction and a credit signal. Upon transmission, the master device decrements the number of stored bus credits an amount corresponding to the bus transaction.

The bus credits correspond to resources on a slave device for receiving bus transactions. If the master device holds the proper credits, the slave device has the capacity to receive the bus transaction. Thus the slave device must receive the bus transaction if accompanied by the proper credits.

After accepting the bus transaction, the slave device services the transaction. Such servicing may include performing a command, recalling data in response to a read or storing data in response to a write. After servicing the bus transaction and resuming a state where the slave device may accept another transaction, the slave device transmits a credit return on the bus. When the master device receives the credit return, it adds the corresponding number and types of credits to the stored amount. Following transmission of the credit return the slave device is ready to accept another bus transaction. Upon receiving the credit return, the master device is re-enabled to initiate the bus transaction.

There are many types of interactions where a bus agent may act as both master and slave depending upon the state of the process. In an ordinary read operation, a first bus agent transmits the read and indicates the read address while acting as a master device. A second bus agent receives and accepts the read while acting as a slave device. The second bus agent services the read by accessing a memory and recalling the specified data while acting as a slave device. In a preferred embodiment the second bus agent transmits the recalled data to the first agent by an independent bus transaction. In this example the second bus agent must store bus credits in number and type to support a data transmission to the first bus agent. If the second agent stores the proper credits, the first bus agent has the capacity to receive and service the bus transaction. In this example, the second bus agent holds sufficient bus credit, initiates the data transfer of the read data. The first bus agent accepts the bus transaction and the read data. The first bus agent services the bus transaction by storing the read data. Upon servicing the bus transaction and clearing resources to receive further bus transactions, the first bus agent transmits a corresponding credit return to the second bus agent. The second bus agent then increments the stored credits, confirming that the first bus agent is again capable of receiving a bus transaction.

In the preferred embodiment more than one such bus exchange may overlap. To keep such overlapping bus transactions separate, the first bus agent preferably transmits a first transaction identification with transaction.

The second bus agent transmits second transaction identification corresponding to the first transaction identification in the bus transaction response. This permits the first bus agent to distinguish the responses.

BRIEF DESCRIPTION OF THE DRAWINGS

These and other aspects of this invention are illustrated in the drawings, in which.

DETAILED DESCRIPTION

Figure 1:
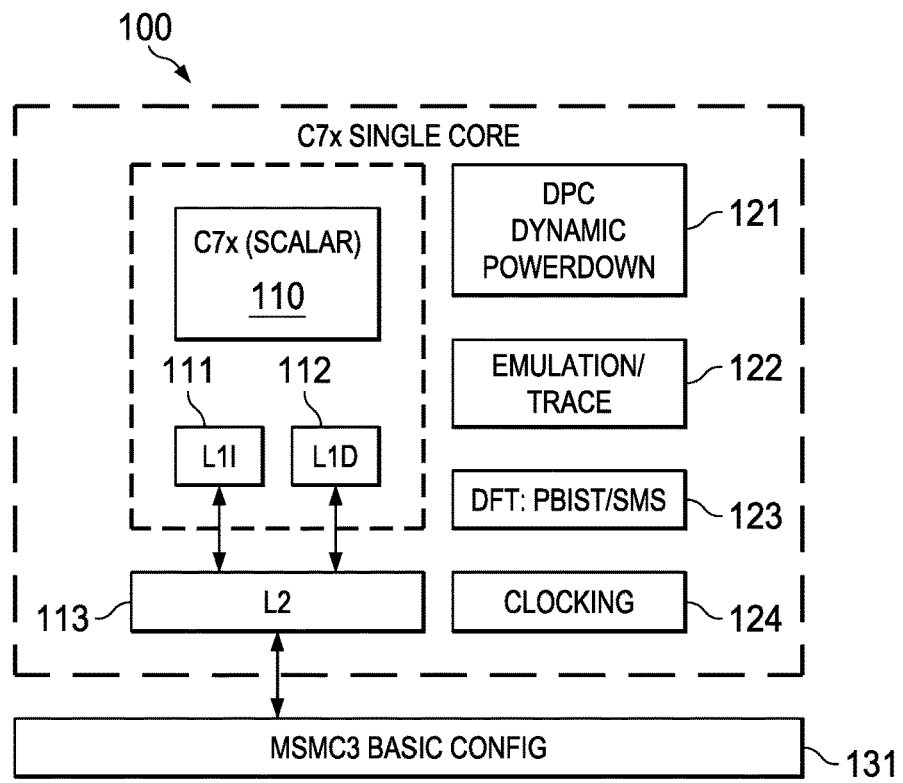
FIG. 1 illustrates a single core scalar processor according to one embodiment of this invention.

FIG. 1 illustrates a single core scalar processor according to one embodiment of this invention. Single core processor 100 includes a scalar central processing unit (CPU) 110 coupled to separate level one instruction cache (L1I) 111 and level one data cache (L1D) 112. Central processing unit core 110 could be constructed as known in the art and would typically include a register file, an integer arithmetic logic unit, an integer multiplier and program flow control units. Single core processor 100 includes a level two combined instruction/data cache (L2) 113 that holds both instructions and data. In the preferred embodiment scalar central processing unit (CPU) 110, level one instruction cache (L1I) 111, level one data cache (L1D) 112 and level two combined instruction/data cache (L2) 113 are formed on a single integrated circuit.

In a preferred embodiment this single integrated circuit also includes auxiliary circuits such as power control circuit 121, emulation/trace circuits 122, design for test (DST) programmable built-in self-test (PBIST) circuit 123 and clocking circuit 124. External to CPU 110 and possibly integrated on single integrated circuit 100 is memory controller 131.

CPU 110 operates under program control to perform data processing operations upon defined data. The program controlling CPU 110 consists of a plurality of instructions that must be fetched before decoding and execution. Single core processor 100 includes a number of cache memories. FIG. 1 illustrates a pair of first level caches. Level one instruction cache (L1I) 111 stores instructions used by CPU 110. CPU 110 first attempts to access any instruction from level one instruction cache 121. Level one data cache (L1D) 112 stores data used by CPU 110. CPU 110 first attempts to access any required data from level one data cache 112. The two level one caches (L1I 111 and L1D 112) are backed by a level two unified cache (L2) 113. In the event of a cache miss to level one instruction cache 111 or to level one data cache 112, the requested instruction or data is sought from level two unified cache 113. If the requested instruction or data is stored in level two unified cache 113, then it is supplied to the requesting level one cache for supply to central processing unit core 110. As is known in the art, the requested instruction or data may be simultaneously supplied to both the requesting cache and CPU 110 to speed use.

Level two unified cache 113 is further coupled to higher level memory systems via memory controller 131. Memory controller 131 handles cache misses in level two unified cache 113 by accessing external memory (not shown in FIG. 1). Memory controller 131 handles all memory centric functions such as cacheabilty determination, error detection and correction, address translation and the like. Single core processor 100 may be a part of a multiprocessor system. In that case memory controller 131 handles data transfer between processors and maintains cache coherence among processors.

Figure 2:
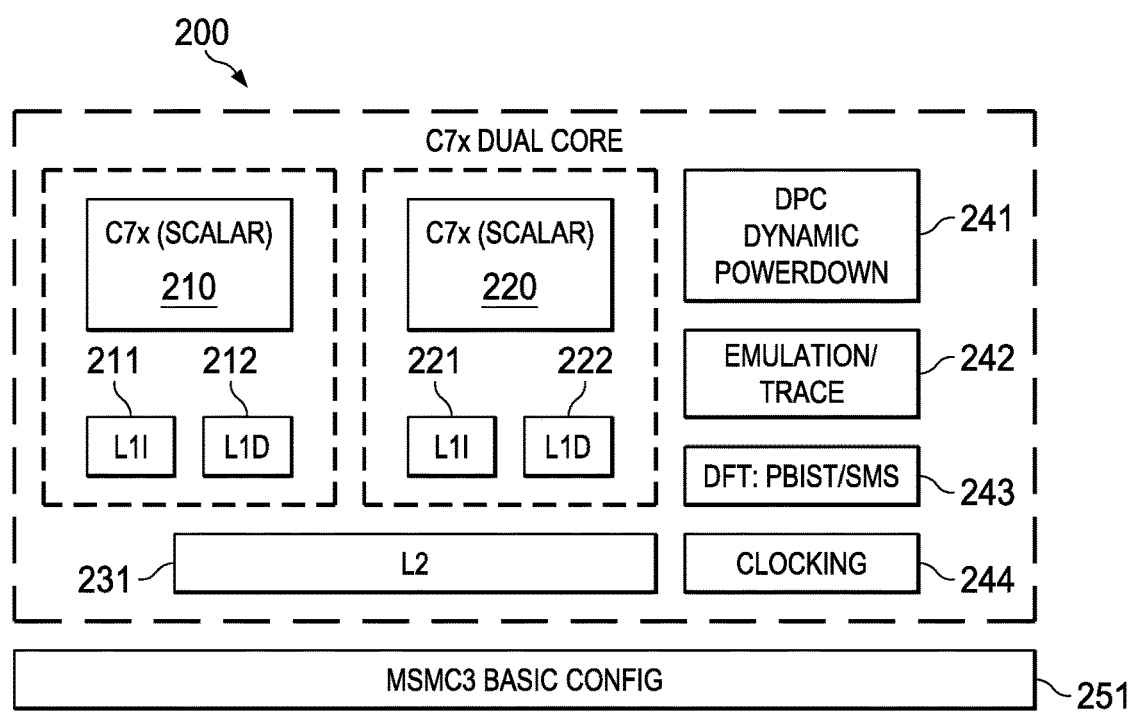
FIG. 2 illustrates a dual core scalar processor according to another embodiment of this invention.

FIG. 2 illustrates a dual core processor according to another embodiment of this invention. Dual core processor 200 includes first CPU 210 coupled to separate level one instruction cache (L1I) 211 and level one data cache (L1D) 212 and second CPU 220 coupled to separate level one instruction cache (L1I) 221 and level one data cache (L1D) 212. Central processing units 210 and 220 are preferably constructed similar to CPU 110 illustrated in FIG. 1. Dual core processor 200 includes a single shared level two combined instruction/data cache (L2) 231 supporting all four level one caches (L1I 211, L1D 212, L1I 221 and L1D 222). In the preferred embodiment CPU 210, level one instruction cache (L1I) 211, level one data cache (L1D) 212, CPU 220, level one instruction cache (L1I) 221, level one data cache (L1D) 222 and level two combined instruction/data cache (L2) 231 are formed on a single integrated circuit. This single integrated circuit preferably also includes auxiliary circuits such as power control circuit 241, emulation/trace circuits 242, design for test (DST) programmable built-in self-test (PBIST) circuit 243 and clocking circuit 244. This single integrated circuit may also include memory controller 251.

Figure 3:
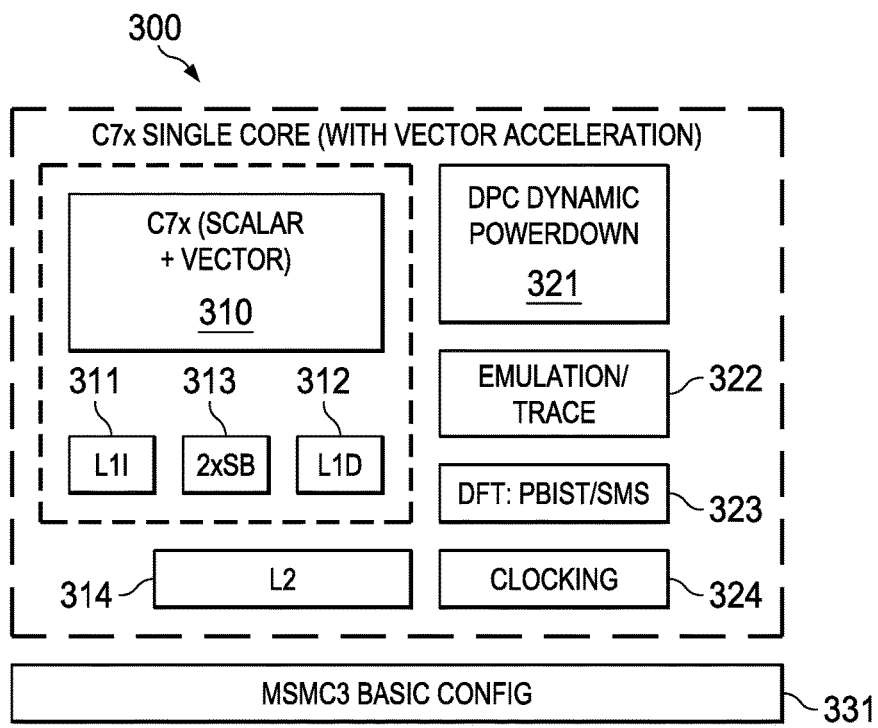
FIG. 3 illustrates a single core vector processor according to a further embodiment of this invention.
Figure 4:
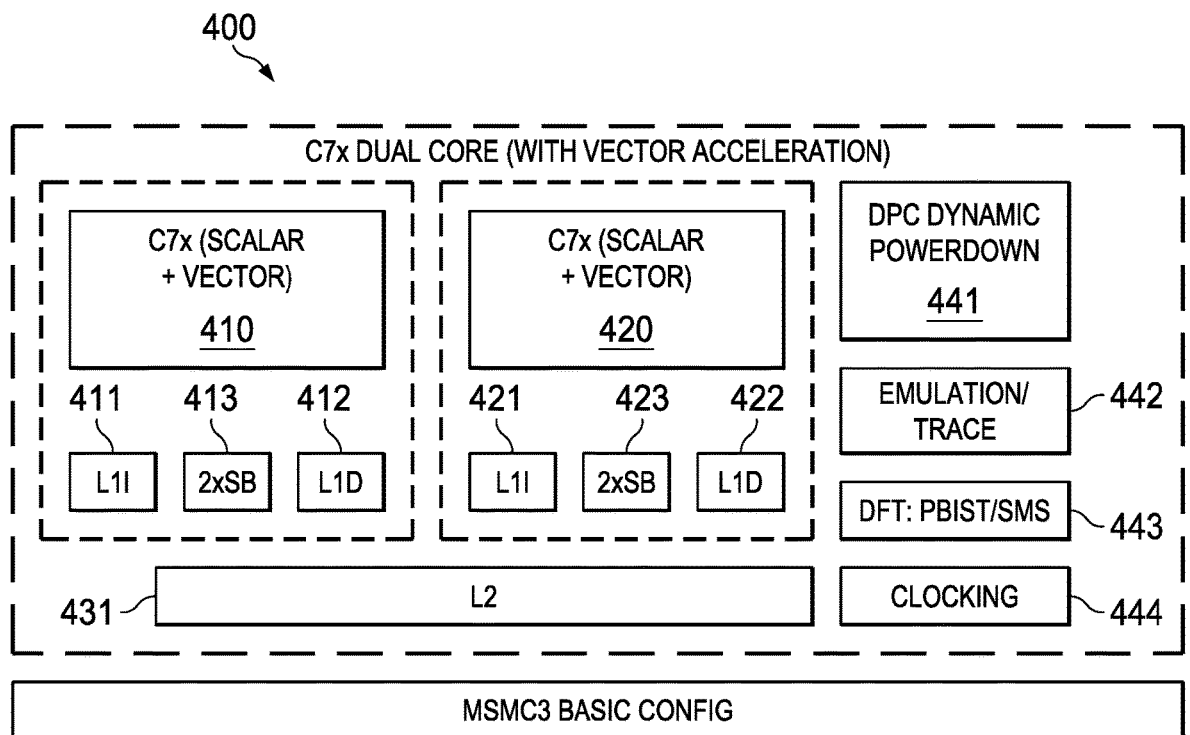
FIG. 4 illustrates a dual core vector processor according to a further embodiment of this invention.

FIGS. 3 and 4 illustrate single core and dual core processors similar to that shown respectively in FIGS. 1 and 2. FIGS. 3 and 4 differ from FIGS. 1 and 2 in showing vector central processing units, as further described below. Single core vector processor 300 includes a vector CPU 310. Dual core vector processor 400 includes two vector CPUs 410 and 420. Vector CPUs 310, 410 and 420 include wider data path operational units and wider data registers than the corresponding scalar CPUs 110, 210 and 220.

Figure 5:
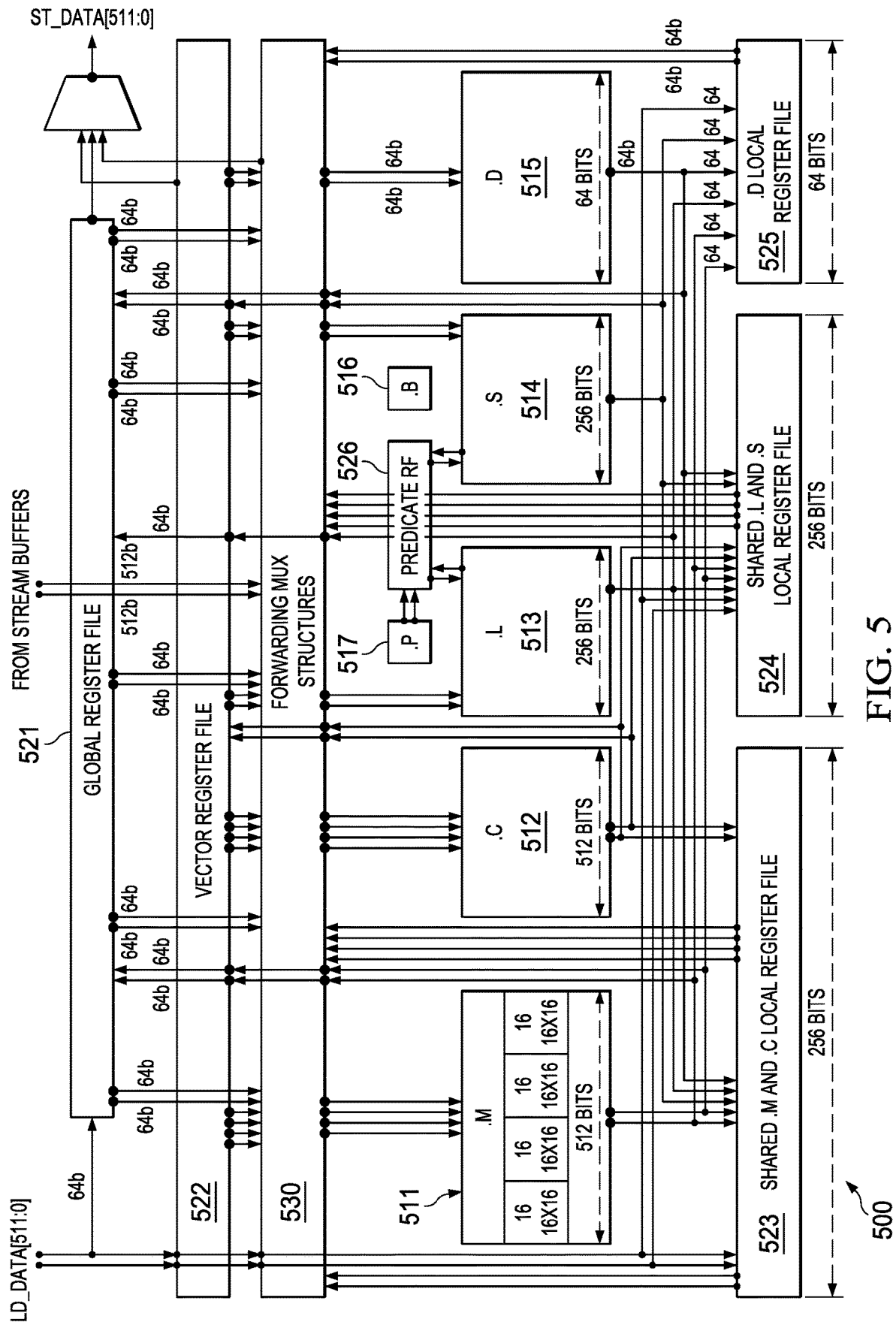
FIG. 5 illustrates construction of one embodiment of the CPU of this invention.

Vector CPUs 310, 410 and 420 further differ from the corresponding scalar CPUs 110, 210 and 220 in the inclusion of streaming engine 313 (FIG. 3) and streaming engines 413 and 423 (FIG. 5). Streaming engines 313, 413 and 423 are similar. Streaming engine 313 transfers data from level two unified cache 313 (L2) to a vector CPU 310. Streaming engine 413 transfers data from level two unified cache 431 to vector CPU 410. Streaming engine 423 transfers data from level two unified cache 431 to vector CPU 420. In accordance with the preferred embodiment each streaming engine 313, 413 and 423 manages up to two data streams.

Each streaming engine 313, 413 and 423 transfer data in certain restricted circumstances. A stream consists of a sequence of elements of a particular type. Programs that operate on streams read the data sequentially, operating on each element in turn. Every stream has the following basic properties. The stream data have a well-defined beginning and ending in time. The stream data have fixed element size and type throughout the stream. The stream data have fixed sequence of elements. Thus programs cannot seek randomly within the stream. The stream data is read-only while active. Programs cannot write to a stream while simultaneously reading from it. Once a stream is opened the streaming engine: calculates the address; fetches the defined data type from level two unified cache; performs data type manipulation such as zero extension, sign extension, data element sorting/swapping such as matrix transposition; and delivers the data directly to the programmed execution unit within the CPU. Streaming engines are thus useful for real-time digital filtering operations on well-behaved data. Streaming engines free these memory fetch tasks from the corresponding CPU enabling other processing functions.

The streaming engines provide the following benefits. They permit multi-dimensional memory accesses. They increase the available bandwidth to the functional units. They minimize the number of cache miss stalls since the stream buffer can bypass L1D cache. They reduce the number of scalar operations required in the loop to maintain. They manage the address pointers. They handle address generation automatically freeing up the address generation instruction slots and the .D unit for other computations.

FIG. 5 illustrates construction of one embodiment of the CPU of this invention. Except where noted this description covers both scalar CPUs and vector CPUs. The CPU embodiment depicted in FIG. 5 includes the following plural execution units multiply unit 511 (.M), correlation unit 512 (.C), arithmetic unit 513 (.L), arithmetic unit 514 (.S), load/store unit 515 (.D), branch unit 516 (.B) and predication unit 517 (.P). The operation and relationships of these execution units are detailed below.

Multiply unit 511 primarily preforms multiplications. Multiply unit 511 accepts up to two double vector operands and produces up to one double vector result. Multiply unit 511 is instruction configurable to perform the following operations: various integer multiply operations, with precision ranging from 8-bits to 64-bits; various regular and complex dot product operations; and various floating point multiply operations; bit-wise logical operations; moves; as well as adds and subtracts. As illustrated in FIG. 5 multiply unit 511 includes hardware for four simultaneous 16 bit by 16 bit multiplications. Multiply unit 511 may access global scalar register file 521, global vector register file 522 and shared .M and C. local register 523 file in a manner described below. Forwarding multiplexer 530 mediates the data transfer between global scalar register file 521, global vector register file 522, the corresponding streaming engine and multiply unit 511.

Correlation unit 512 (.C) accepts up to two double vector operands and produces up to one double vector result. Correlation unit 512 supports these major operations. In support of WCDMA "Rake" and "Search" instructions correlation unit 512 performs up to 512 2-bit PN*8-bit I/Q complex multiplies per clock cycle. Correlation unit 512 performs 8-bit and 16-bit Sum-of-Absolute-Difference (SAD) calculations performing up to 512 SADs per clock cycle. Correlation unit 512 performs horizontal add and horizontal min/max instructions. Correlation unit 512 performs vector permutes instructions. Correlation unit 512 includes contains 8 256-bit wide control registers. These control registers are used to control the operations of certain correlation unit instructions. Correlation unit 512 may access global scalar register file 521, global vector register file 522 and shared .M and C. local register file 523 in a manner described below. Forwarding multiplexer 530 mediates the data transfer between global scalar register file 521, global vector register file 522, the corresponding streaming engine and correlation unit 512.

CPU 500 includes two arithmetic units: arithmetic unit 513 (.L) and arithmetic unit 514 (.S). Each arithmetic unit 513 and arithmetic unit 514 accepts up to two vector operands and produces one vector result. The compute units support these major operations. Arithmetic unit 513 and arithmetic unit 514 perform various single-instruction-multiple-data (SIMD) fixed point arithmetic operations with precision ranging from 8-bit to 64-bits. Arithmetic unit 513 and arithmetic unit 514 perform various vector compare and minimum/maximum instructions which write results directly to predicate register file 526 (further described below). These comparisons include A=B, A>B, A≥B, A<B and A≤B. If the comparison is correct, a 1 bit is stored in the corresponding bit position within the predicate register. If the comparison fails, a 0 is stored in the corresponding bit position within the predicate register. Vector compare instructions assume byte (8 bit) data and thus generate 32 single bit results. Arithmetic unit 513 and arithmetic unit 514 perform various vector operations using a designated predicate register as explained below. Arithmetic unit 513 and arithmetic unit 514 perform various SIMD floating point arithmetic operations with precision ranging from half-precision (16-bits), single precision (32-bits) to double precision (64-bits). Arithmetic unit 513 and arithmetic unit 514 perform specialized instructions to speed up various algorithms and functions. Arithmetic unit 513 and arithmetic unit 514 may access global scalar register file 521, global vector register file 522, shared .L and .S local register file 524 and predicate register file 526. Forwarding multiplexer 530 mediates the data transfer between global scalar register file 521, global vector register file 522, the corresponding streaming engine and arithmetic units 513 and 514.

Load/store unit 515 (.D) is primarily used for address calculations. Load/store unit 515 is expanded to accept scalar operands up to 64-bits and produces scalar result up to 64-bits. Load/store unit 515 includes additional hardware to perform data manipulations such as swapping, pack and unpack on the load and store data to reduce workloads on the other units. Load/store unit 515 can send out one load or store request each clock cycle along with the 44-bit physical address to level one data cache (L1D). Load or store data width can be 32-bits, 64-bits, 256-bits or 512-bits. Load/store unit 515 supports these major operations: 64-bit SIMD arithmetic operations; 64-bit bit-wise logical operations; and scalar and vector load and store data manipulations. Load/store unit 515 preferably includes a micro-TLB (table lookaside buffer) block to perform address translation from a 48-bit virtual address to a 44-bit physical address. Load/store unit 515 may access global scalar register file 521, global vector register file 522 and .D local register file 525 in a manner described below. Forwarding multiplexer 530 mediates the data transfer between global scalar register file 521, global vector register file 522, the corresponding streaming engine and load/store unit 515.

Branch unit 516 (.B) calculates branch addresses, performs branch predictions, and alters control flows dependent on the outcome of the prediction.

Predication unit 517 (.P) is a small control unit which performs basic operations on vector predication registers. Predication unit 517 has direct access to the vector predication registers 526. Predication unit 517 performs different bit operations on the predication registers such as AND, ANDN, OR, XOR, NOR, BITR, NEG, SET, BITCNT (bit count), RMBD (right most bit detect), BIT Decimate and Expand, etc.

Figure 6:
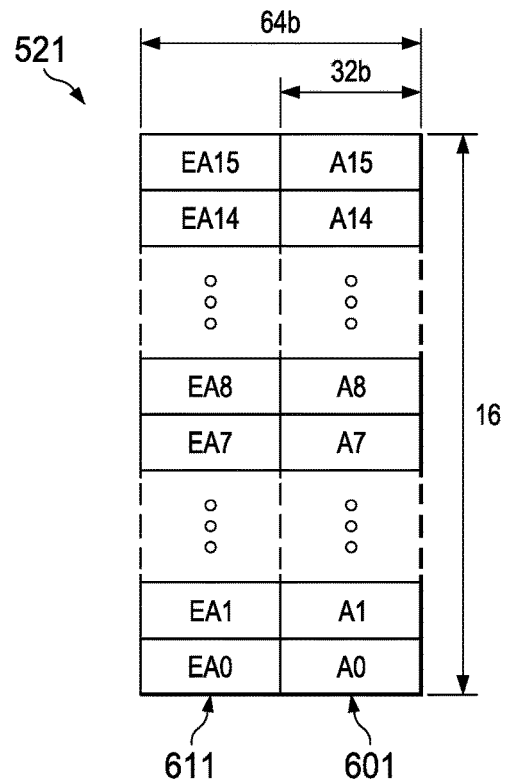
FIG. 6 illustrates a global scalar register file.

FIG. 6 illustrates global scalar register file 521. There are 16 independent 64-bit wide scalar registers. Each register of global scalar register file 521 can be read as 32-bits of scalar data (designated registers A0 to A15 601) or 64-bits of scalar data (designated registers EA0 to EA15 611). However, writes are always 64-bit, zero-extended to fill up to 64-bits if needed. All scalar instructions of all functional units can read from or write to global scalar register file 521. The instruction type determines the data size. Global scalar register file 521 supports data types ranging in size from 8-bits through 64-bits. A vector instruction can also write to the 64-bit global scalar registers 521 with the upper 192 bits data of the vector being discarded. A vector instruction can also read 64-bit data from the global scalar register file 511. In this case the operand is zero-extended in the upper 192-bit to form an input vector.

Figure 7:
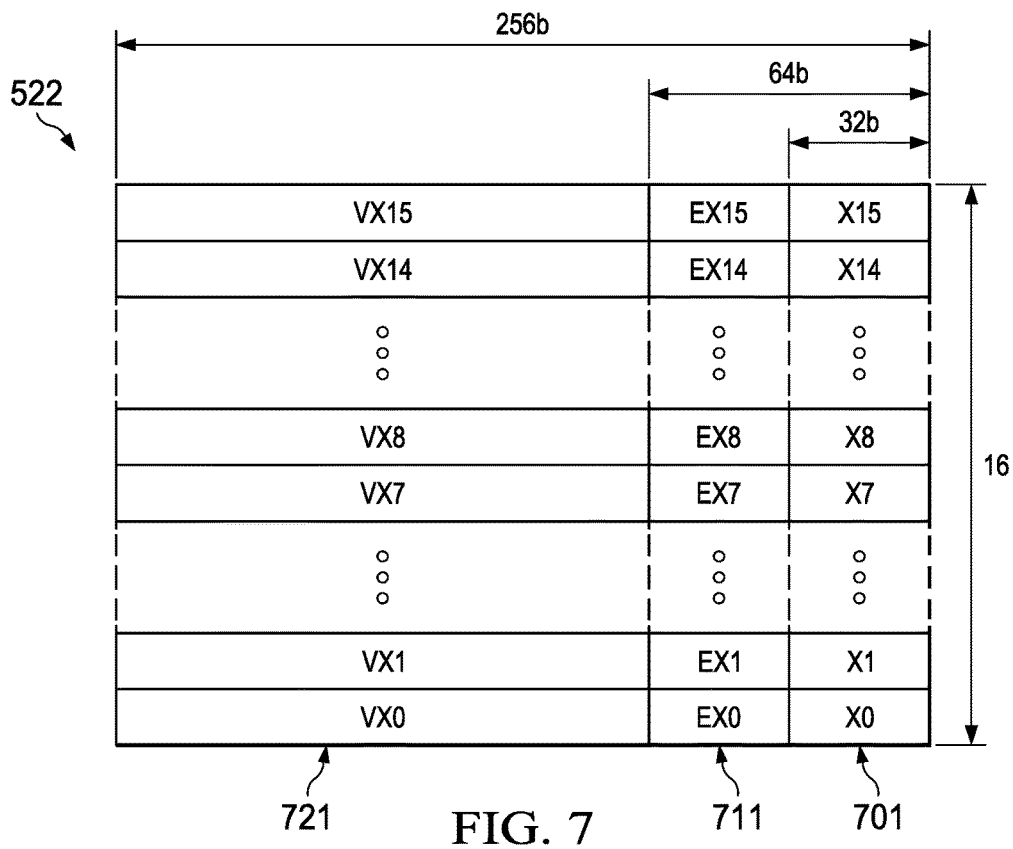
FIG. 7 illustrates a global vector register file.

FIG. 7 illustrates global vector register file 522. There are 16 independent 256-bit wide vector registers. Each register of global vector register file 522 can be read as 32-bits scalar data (designated registers X0 to X15 701), 64-bits of scalar data (designated registers EX0 to EX15 711), 256-bit vector data (designated registers VX0 to VX15 721) or 512-bit double vector data (designated DVX0 to DVX7, not illustrated). In the current embodiment only multiply unit 511 and correlation unit 512 may execute double vector instructions. All vector instructions of all functional units can read or write to global vector register file 522. Any scalar instruction of any functional unit can also access the low 32 or 64 bits of global vector register file 522 register for read or write. The instruction type determines the data size.

Figure 8:
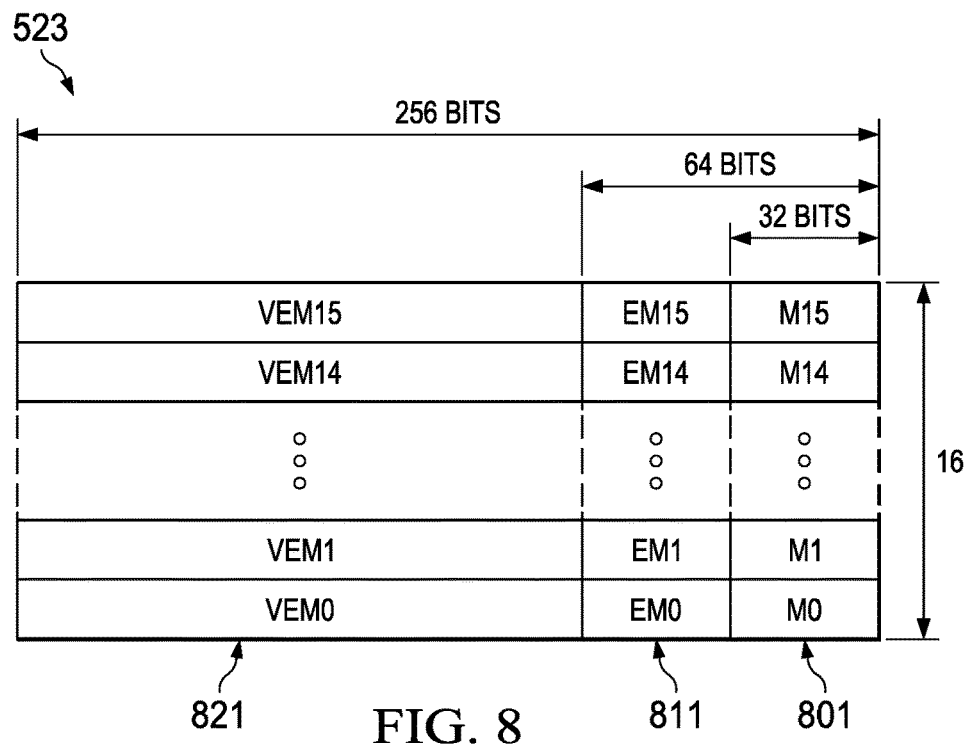
FIG. 8 illustrates a local vector register file shared by the multiply and correlation functional units.

FIG. 8 illustrates local vector register file 523. There are 16 independent 256-bit wide vector registers. Each register of local vector register file 523 can be read as 32-bits scalar data (designated registers M0 to M15 801), 64-bits of scalar data (designated registers EM0 to EM15 811), 256-bit vector data (designated registers VM0 to VM15 821) or 512-bit double vector data (designated DVM0 to DVM7, not illustrated). In the current embodiment only multiply unit 511 and correlation unit 512 may execute double vector instructions. All vector instructions of all functional units can write to local vector register file 523. Only instructions of multiply unit 511 and correlation unit 512 may read from local vector register file 523. The instruction type determines the data size.

Multiply unit 511 may operate upon double vectors (512-bit data). Multiply unit 511 may read double vector data from and write double vector data to global vector register file 521 and local vector register file 523. Register designations DVXx and DVMx are mapped to global vector register file 521 and local vector register file 523 as follows.

TABLE 1

| Instruction Designation | Register Accessed |
|---|---|
| DVX0 | VX1:VX0 |
| DVX1 | VX3:VX2 |
| DVX2 | VX5:VX4 |

TABLE 1-continued

| Instruction Designation | Register Accessed |
|---|---|
| DVX3 | VX7:VX6 |
| DVX4 | VX9:VX8 |
| DVX5 | VX11:VX10 |
| DVX6 | VX13:VX12 |
| DVX7 | VX15:VX14 |
| DVM0 | VM1:VM0 |
| DVM1 | VM3:VM2 |
| DVM2 | VM5:VM4 |
| DVM3 | VM7:VM6 |
| DVM4 | VM9:VM8 |
| DVM5 | VM11:VM10 |
| DVM6 | VM13:VM12 |
| DVM7 | VM15:VM14 |

Each double vector designation maps to a corresponding pair of adjacent vector registers in either global vector register 522 or local vector register 523. Designations DVX0 to DVX7 map to global vector register 522. Designations DVM0 to DVM7 map to local vector register 523.

Local vector register file 524 is similar to local vector register file 523. There are 16 independent 256-bit wide vector registers. Each register of local vector register file 524 can be read as 32-bits scalar data (designated registers L0 to L15 701), 64-bits of scalar data (designated registers EL0 to EL15 711) or 256-bit vector data (designated registers VL0 to VL15 721). All vector instructions of all functional units can write to local vector register file 524. Only instructions of arithmetic unit 513 and arithmetic unit 514 may read from local vector register file 524.

Figure 9:
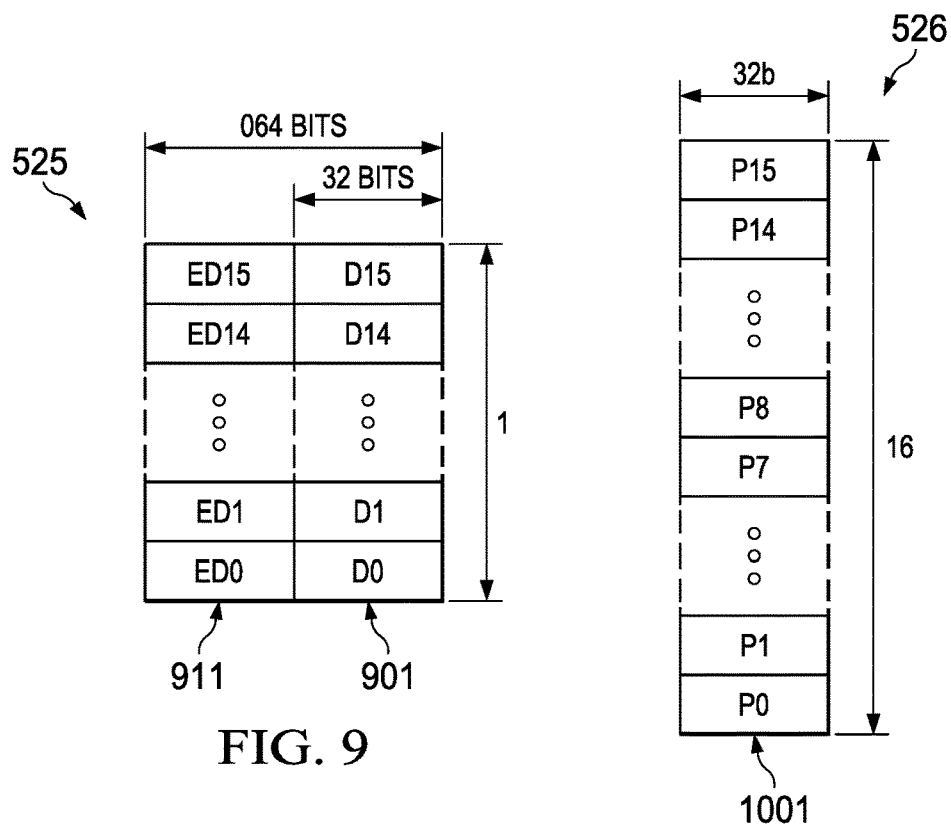
FIG. 9 illustrates a local register file of a load/store unit.

FIG. 9 illustrates local register file 525. There are 16 independent 64-bit wide registers. Each register of local register file 525 can be read as 32-bits scalar data (designated registers D0 to D15 901) or 64-bits of scalar data (designated registers ED0 to ED15 911). All scalar and vector instructions of all functional units can write to local register file 525. Only instructions of load/store unit 515 may read from local register file 525. Any vector instructions can also write 64-bit data to local register file 525 with the upper 192-bit data of the result vector being discarded. Any vector instructions can also read 64-bit data from the 64-bit local register file 525 registers. The return data is zero-extended in the upper 192-bits to form an input vector. The registers of local register file 525 can only be used as addresses in load/store instructions, not to store data or as sources for 64-bit arithmetic and logical instructions of load/store unit 515.

Figure 10:
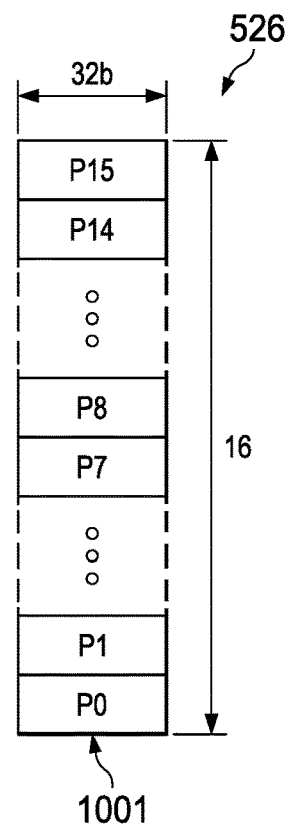
FIG. 10 illustrates a predicate register file.

FIG. 10 illustrates the predicate register file 526. There are sixteen 32-bit registers in predicate register file 526. Predicate register file 526 contains the results from vector comparison operations executed by either arithmetic and is used by vector selection instructions and vector predicated store instructions. A small subset of special instructions can also read directly from predicate registers, performs operations and write back to a predicate register directly. There are also instructions which can transfer values between the global register files (521 and 522) and predicate register file 526. Transfers between predicate register file 526 and local register files (523, 524 and 525) are not supported. Each bit of a predicate register (designated P0 to P15) controls a byte of vector data. Since a vector is 256 bits, the width of a predicate register equals 256/8=32 bits. The predicate register file 526 can be written to by vector comparison operations to store the results of the vector compares.

A CPU such as CPU 110, 210, 220, 310, 410 or 420 operates on an instruction pipeline. This instruction pipeline can dispatch up to nine parallel 32-bits slots to provide instructions to the seven execution units (multiply unit 511, correlation unit 512, arithmetic unit 513, arithmetic unit 514, load/store unit 515, branch unit 516 and predication unit 517) every cycle. Instructions are fetched instruction packets of fixed length further described below. All instructions require the same number of pipeline phases for fetch and decode, but may require a varying number of execute phases.

Figure 11:
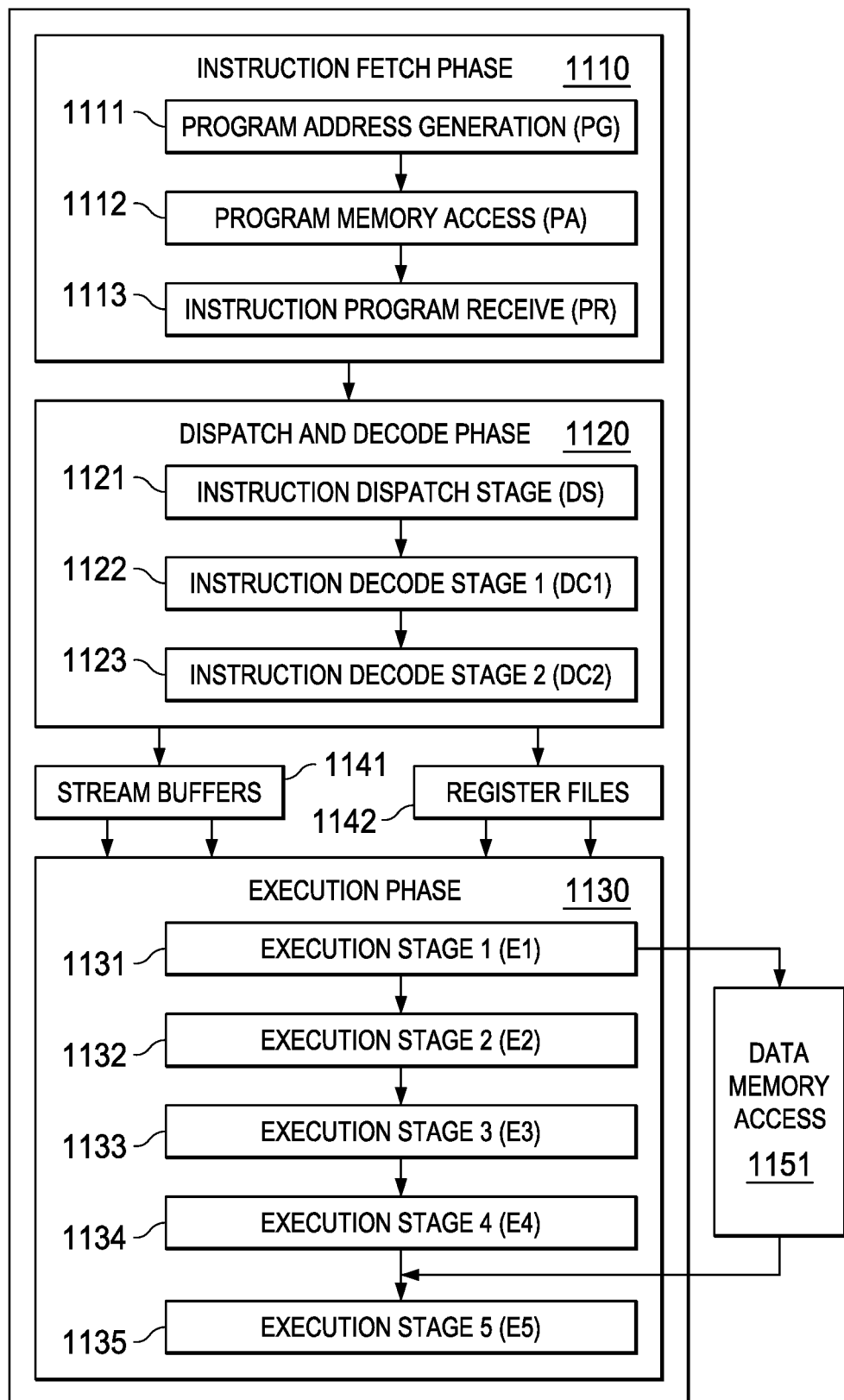
FIG. 11 illustrates pipeline phases of the central processing unit according to an embodiment of this invention.

FIG. 11 illustrates the following pipeline phases: program fetch phase 1110, dispatch and decode phases 1120 and execution phases 1130. Program fetch phase 1110 includes three stages for all instructions. Dispatch and decode phases 1120 include three stages for all instructions. Execution phase 1130 includes one to four stages dependent on the instruction.

Fetch phase 1110 includes program address generation stage 1111 (PG), program access stage 1112 (PA) and program receive stage 1113 (PR). During program address generation stage 1111 (PG), the program address is generated in the CPU and the read request is sent to the memory controller for the level one instruction cache L1I. During the program access stage 1112 (PA) the level one instruction cache L1I processes the request, accesses the data in its memory and sends a fetch packet to the CPU boundary. During the program receive stage 1113 (PR) the CPU registers the fetch packet.

Figure 12:
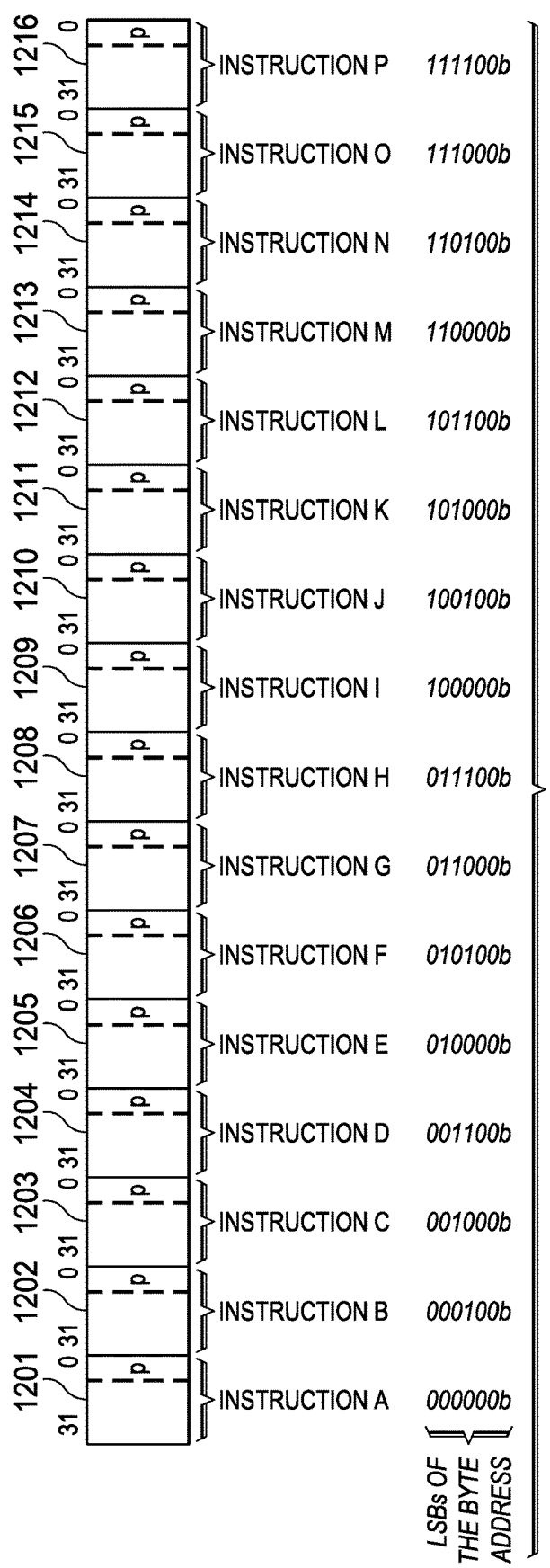
FIG. 12 illustrates sixteen instructions of a single fetch packet.

Instructions are always fetched sixteen words at a time. FIG. 12 illustrates this fetch packet. FIG. 12 illustrates 16 instructions 1201 to 1216 of a single fetch packet. Fetch packets are aligned on 512-bit (16-word) boundaries. The execution of the individual instructions is partially controlled by a p bit in each instruction. This p bit is preferably bit 0 of the instruction. The p bit determines whether the instruction executes in parallel with another instruction. The p bits are scanned from lower to higher address. If the p bit of an instruction is 1, then the next following instruction is executed in parallel with (in the same cycle as) that instruction. If the p bit of an instruction is 0, then the next following instruction is executed in the cycle after the instruction. All instructions executing in parallel constitute an execute packet. An execute packet can contain up to nine instructions. Each instruction in an execute packet must use a different functional unit. An execute packet can contain up to nine 32-bit wide slots. A slot can either be a self-contained instruction or expand the constant field specified by the immediate preceding instruction. A slot can be used as conditional codes to apply to the instructions within the same fetch packet. A fetch packet can contain up to 2 constant extension slots and one condition code extension slot.

There are up to 11 distinct instruction slots, but scheduling restrictions limit to 9 the maximum number of parallel slots. The maximum nine slots are shared as follows: multiply unit 511; correlation unit 512; arithmetic unit 513; arithmetic unit 514; load/store unit 515; branch unit 516 shared with predicate unit 517; a first constant extension; a second constant extension; and a unit-less instruction shared with a condition code extension. The last instruction in an execute packet has a p bit equal to 0.

The CPU and level one instruction cache L1I pipelines are de-coupled from each other. Fetch packet returns from level one instruction cache L1I can take different number of clock cycles, depending on external circumstances such as whether there is a hit in level one instruction cache L1I. Therefore program access stage 1112 (PA) can take several clock cycles instead of 1 clock cycle as in the other stages.

Dispatch and decode phases 1120 include instruction dispatch to appropriate execution unit stage 1121 (DS), instruction pre-decode stage 1122 (DC1); and instruction decode, operand reads stage 1123 (DC2). During instruction dispatch to appropriate execution unit stage 1121 (DS) the fetch packets are split into execute packets and assigned to the appropriate functional units. During the instruction pre-decode stage 1122 (DC1), the source registers, destination registers, and associated paths are decoded for the execution of the instructions in the functional units. During the instruction decode, operand reads stage 1123 (DC2), more detailed unit decodes are done, as well as reading operands from the register files.

Execution phases 1130 includes execution stages 1131 to 1135 (E1 to E5). Different types of instructions require different numbers of these stages to complete their execution. These stages of the pipeline play an important role in understanding the device state at CPU cycle boundaries.

During execute 1 stage 1131 (E1) the conditions for the instructions are evaluated and operands are operated on. As illustrated in FIG. 11, execute 1 stage 1131 may receive operands from a stream buffer 1141 and one of the register files shown schematically as 1142. For load and store instructions, address generation is performed and address modifications are written to a register file. For branch instructions, branch fetch packet in PG phase 1111 is affected. As illustrated in FIG. 11, load and store instructions access memory here shown schematically as memory 1151. For single-cycle instructions, results are written to a destination register file. This assumes that any conditions for the instructions are evaluated as true. If a condition is evaluated as false, the instruction does not write any results or have any pipeline operation after execute 1 stage 1131.

During execute 2 stage 1132 (E2) load instructions send the address to memory. Store instructions send the address and data to memory. Single-cycle instructions that saturate results set the SAT bit in the control status register (CSR) if saturation occurs. For 2-cycle instructions, results are written to a destination register file.

During execute 3 stage 1133 (E3) data memory accesses are performed. Any multiply instructions that saturate results set the SAT bit in the control status register (CSR) if saturation occurs. For 3-cycle instructions, results are written to a destination register file.

During execute 4 stage 1134 (E4) load instructions bring data to the CPU boundary. For 4-cycle instructions, results are written to a destination register file.

During execute 5 stage 1135 (E5) load instructions write data into a register. This is illustrated schematically in FIG. 11 with input from memory 1151 to execute 5 stage 1135.

Figure 13:
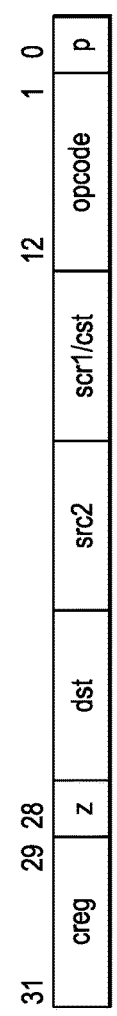
FIG. 13 illustrates an example of the instruction coding of instructions used by this invention.

FIG. 13 illustrates an example of the instruction coding of instructions used by this invention. Each instruction consists of 32 bits and controls the operation of one of the individually controllable functional units (multiply unit 511, correlation unit 512, arithmetic unit 513, arithmetic unit 514, load/store unit 515). The bit fields are defined as follows. The creg field and the z bit are optional fields used in conditional instructions. These bits are used for conditional instructions to identify the predicate register and the condition. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field and the z field are encoded in the instruction as shown in Table 2.

TABLE 2

| Conditional | creg | | | z |
|---|---|---|---|---|
| Register | 31 | 30 | 29 | 28 |
| Unconditional | 0 | 0 | 0 | 0 |
| Reserved | 0 | 0 | 0 | 1 |
| A0 | 0 | 0 | 1 | z |
| A1 | 0 | 1 | 0 | z |
| A2 | 0 | 1 | 1 | z |
| A3 | 1 | 0 | 0 | z |
| A4 | 1 | 0 | 1 | z |
| A5 | 1 | 1 | 0 | z |
| Reserved | 1 | 1 | x | x |

Note that "z" in the z bit column refers to the zero/not zero comparison selection noted above and "x" is a don't care state. This coding can only specify a subset of the 16 global scalar registers as predicate registers. This selection was made to preserve bits in the instruction coding. Note that unconditional instructions do not have these optional bits. For unconditional instructions these bits (28 to 31) are preferably used as additional opcode bits. However, if needed, an execute packet can contain a unique 32-bit condition code extension slot which contains the 4-bit creg/z fields for the instructions which are in the same execute packet. Table 3 shows the coding of such a condition code extension slot.

TABLE 3

| Bits | Functional Unit |
|---|---|
| 3:0 | .L |
| 7:4 | .S |
| 11:5 | .D |
| 15:12 | .M |
| 19:16 | .C |
| 23:20 | .B |
| 28:24 | Reserved |
| 31:29 | Reserved |

Thus the condition code extension slot specifies bits decoded in the same way the creg/z bits assigned to a particular functional unit in the same execute packet.

Special vector predicate instructions use the designated predicate register to control vector operations.

In the current embodiment all these vector predicate instructions operate on byte (8 bit) data. Each bit of the predicate register controls whether a SIMD operation is performed upon the corresponding byte of data. The operations of predicate unit 517 permit a variety of compound vector SIMD operations based upon more than one vector comparison. For example a range determination can be made using two comparisons. A candidate vector is compared with a first vector reference having the minimum of the range packed within a first data register. A second comparison of the candidate vector is made with a second reference vector having the maximum of the range packed within a second data register. Logical combinations of the two resulting predicate registers would permit a vector conditional operation to determine whether each data part of the candidate vector is within range or out of range.

The dst field specifies a register in a corresponding register file as the destination of the instruction results.

The src2 field specifies a register in a corresponding register file as the second source operand.

The src1/cst field has several meanings depending on the instruction opcode field (bits 1 to 12 and additionally bits 28 to 31 for unconditional instructions). The first meaning specifies a register of a corresponding register file as the first operand. The second meaning is an immediate constant. Depending on the instruction type, this is treated as an unsigned integer and zero extended to a specified data length or is treated as a signed integer and sign extended to the specified data length.

The opcode field (bits 1 to 12 for all instructions and additionally bits 28 to 31 for unconditional instructions) specifies the type of instruction and designates appropriate instruction options. This includes designation of the functional unit and operation performed. A detailed explanation of the opcode is beyond the scope of this invention except for the instruction options detailed below.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

Correlation unit 512 and arithmetic units 513 and 514 often operate in a single instruction multiple data (SIMD) mode. In this SIMD mode the same instruction is applied to packed data from the two operands. Each operand holds plural data elements disposed in predetermined slots. SIMD operation is enabled by carry control at the data boundaries. Such carry control enables operations on varying data widths.

Figure 14:
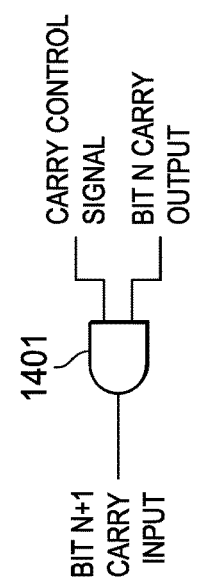
FIG. 14 illustrates the carry control for SIMD operations according to this invention.

FIG. 14 illustrates the carry control. AND gate 1401 receives the carry output of bit N within the operand wide arithmetic logic unit (256 bits for arithmetic units 513 and 514, 512 bits for correlation unit 512). AND gate 1401 also receives a carry control signal which will be further explained below. The output of AND gate 1401 is supplied to the carry input of bit N+1 of the operand wide arithmetic logic unit. AND gates such as AND gate 1401 are disposed between every pair of bits at a possible data boundary. For example, for 8-bit data such an AND gate will be between bits 7 and 8, bits 15 and 16, bits 23 and 24, etc. Each such AND gate receives a corresponding carry control signal. If the data size is of the minimum, then each carry control signal is 0, effectively blocking carry transmission between the adjacent bits. The corresponding carry control signal is 1 if the selected data size requires both arithmetic logic unit sections. Table 4 below shows example carry control signals for the case of a 256 bit wide operand such as used in arithmetic units 513 and 514 which may be divided into sections of 8 bits, 16 bits, 32 bits, 64 bits or 128 bits. No control of the carry output of the most significant bit is needed, thus only 31 carry control signals are required.

TABLE 4

| Data Size | Carry Control Signals |
|---|---|
| 8 bits | –000 0000 0000 0000 0000 0000 0000 0000 |
| 16 bits | –101 0101 0101 0101 0101 0101 0101 0101 |
| 32 bits | –111 0111 0111 0111 0111 0111 0111 0111 |

TABLE 4-continued

| Data Size | Carry Control Signals |
|---|---|
| 64 bits | -111 1111 0111 1111 0111 1111 0111 1111 |
| 128 bits | -111 1111 1111 1111 0111 1111 1111 1111 |
| 256 bits | -111 1111 1111 1111 1111 1111 1111 1111 |

It is typical in the art to operate on data sizes that are integral powers of 2 ($2^N$). However, this carry control technique is not limited to integral powers of 2. One skilled in the art would understand how to apply this technique to other data sizes and other operand widths.

Figure 15:
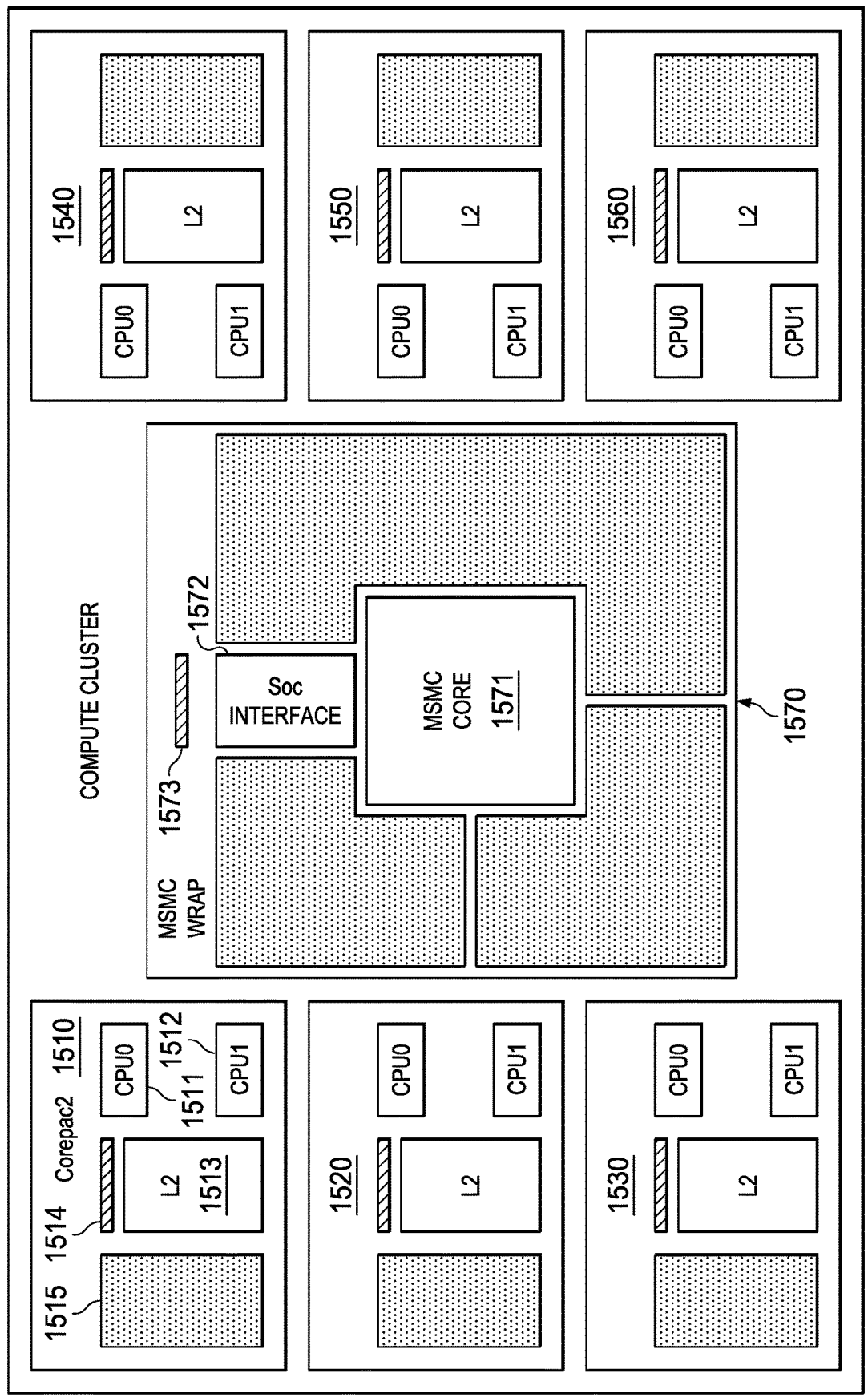
FIG. 15 illustrates a compute cluster 1500 to which the present invention is applicable.

FIG. 15 illustrates a compute cluster 1500 to which the present invention is applicable. Compute cluster 1500 is preferably embodied in a single integrated circuit. Compute cluster 1500 includes 6 dual core units 1510, 1520, 1530, 1540, 1550 and 1560. Each dual core unit 1510, 1520, 1530, 1540, 1550 and 1560 may be a scalar dual core unit such as illustrated at 200 in FIG. 2 or a vector dual core unit such as 400 illustrated in FIG. 4. A representative dual core 1510 includes first CPU0 1511, second CPU1 1512, each of which include separate L1I and L1D caches, shared level 2 (L2) cache 1513, power control circuits 1514 and miscellaneous support circuits 1515. The 6 dual core units 1510, 1520, 1530, 1540, 1550 and 1560 are connected to a multicore shared memory controller (MSMC) 1570. Multicore shared memory controller 1570 includes MSMC core 1571, system on chip (SOC) interface 1572, power circuits 1573 and various unlabeled support circuits. Multicore shared memory controller 1570 serves as the interface between compute cluster 1500 and system memory, which may include level 3 (L3) cache, external interfaces and the like. Multicore shared memory controller 1570 interconnects various parts of compute cluster 1500 with L3 SRAM/cache. The unlabeled support circuits integrates the necessary L3 SRAM per SOC, clock, design for test (DFT), power management and necessary integration logic to interface with SOC modules.

Dual cores 1510, 1520, 1530, 1540, 1550 and 1560 are interconnected with MSMC 1570 via a multicore bus architecture (MBA). The MBA protocol of this invention replaces the traditional communication handshake with a credit system. The MBA credit system provides a mechanism for the master to accurately track the slave's ability to accept transactions by tracking the number of available credits.

Each transaction sent from a master to a slave requires the master to spend at least one credit. A credit is a finite resource that entitles the master to send a transaction of a specific type. Generally the credit will represent a physical storage location in the slave where the transaction will reside upon receipt by the slave.

The master is required to accurately track the number of total credits in its possession. For each transaction, at least one credit is spent by the master, resulting in a decrement of the number of available credits. If the master has spent all available credits for a given credit type, it can no longer send transactions that require that credit type. It is also possible that the master holds fewer credits than required by the transaction. The available credit of a particular type may track the number of data buffers available in the slave. The master cannot initiate a transaction for which it lacks the type and number of credits needed. An agent may limit a transaction such as limiting a write amount to the available credit types and number corresponding to the guaranteed slave capacity.

The slave must return credits back to the master once the physical resource corresponding to the credit type has been freed. Thus the master spends credits and the slave returns credits. The total number of credits in the system is fixed, and it is a closed system. The mapping of transaction types to credit types is implementation dependent and not specified by the MBA protocol.

The credit system created in the MBA protocol changes the negotiation between master and slave to create a higher performance, higher utilization interface. Because the traditional handshake requires that the slave acknowledge a transaction prior to accepting and processing the transaction, such a transaction can block the bus while waiting for acknowledgement. In the traditional communication handshake, the master neither knows nor needs to know whether a slave is able to accept a transaction. The master places the transaction on the bus and asserts a request. The slave may accept the command at any point when it is ready by asserting an acknowledge.

The credit system of this invention allows the master to track the slave's ability to accept a transaction, therefore removing the acknowledge from the handshake. Because the master tracks the number of available credits for each credit type, the master will only transmit transactions that are guaranteed to be accepted by the slave.

Credits are a finite resource representing a physical resource in the slave. Credits are spent by the master for each transaction. Credits must be returned from the slave to the master once the slave processes a transaction enough to free the physical resource associated with the credit type. The return of a credit occurs after transaction processing is underway in the slave, removing this action from the critical path. In contrast the traditional handshake places the slave acknowledge in the critical path to processing a transaction.

There are two key advantages to the MBA credit system over traditional communication handshakes. The first advantage is that transactions occupy the communication channel for exactly one cycle. This prevents a single transaction from blocking the channel while waiting for acknowledgement from the slave. This results in a higher throughput communication channel, especially when the same physical channel is being shared by multiple virtual or physical masters. The second advantage is that the communication handshake required to transmit a transaction from master to slave is shortened by removing the acknowledgement signal as a requirement to transmitting a transaction. This reduces the overall latency of communicating a transaction from master to slave, resulting in a higher performance communication.

The Multicore Bus Architecture (MBA) of this invention is a high performance, point-to-point, unidirectional bus protocol designed for internal connections between devices in a multiprocessor platform. The MBA protocol has the following characteristics. The MBA protocol is point-to-point. Exactly two agents communicate by discrete transactions. One agent acts as the master and the other agent acts as the slave. Broadcast between a single master and multiple slaves is not supported. The MBA protocol is unidirectional. Command transactions may only be initiated by the master. The slave may not initiate command transactions. Response transactions are initiated on a second, mirrored interface. The MBA protocol is non-blocking. Transactions originated by the master must be accepted by the slave in a single cycle. There is no provision for stalling transactions on the bus. The MBA protocol is credit-based. Every transaction has an associated credit and credit-type. The master must have an appropriate credit before it can initiate a transaction. Possession of a credit of the appropriate credit-type guarantees that the slave will accept the transaction.

The following terms are used throughout this specification to precisely identify devices and their behavior in the protocol.

Agent: A single device or logic controller that communicates using the MBA protocol defined in this specification.

Agent-pair: Two agents communicating using the MBA protocol.

Transaction: A read, write, or message communication between two agents, master and slave, that may or may not involve the transfer of data from master to slave.

Master: The agent that initiates a transaction.

Slave: The agent that receives a transaction initiated by the master

Core-side: The agent closer to the CPU core in a transaction between where both agents may have hardware caches (e.g. in a cache hierarchy).

Far-side: The agent farther from the CPU core in a transaction where both agents may have hardware caches such as in a cache hierarchy.

Data phase: A single beat of data transferred in a single cycle on the Transaction Data Channel (TDC).

Data transfer: The complete collection of data phases for a single transaction ID (did[11:0]), where the final data phase is denoted by the assertion of the dlast signal.

Data window: The maximum size of a data transfer as determined by the width of the ddata[CFG:0] signal. The default width is 512 bits.

Command Transaction: A type of transaction that begins a sequence between two agents. Command transactions are distinguished by a unique command ID (cid[11:0]) and may or may not involve the transfer of data.

Response Transaction: A type of transaction that completes a sequence between two agents. Response transactions are matched by command ID (cid[11:0]) to a previously initiated command transaction and may or may not involve the transfer of data.

Write Response: A dedicated response on the Write Response Channel (WRC) that completes a sequence for write command transactions.

Transaction Sequence: A complete protocol-level communication between two agents using a paired interface topology. A sequence begins with a command transaction initiated by one agent and completes with either a response transaction or a write response from the other agent.

Credit: A single, atomic unit that entitles the master to originate a single transaction which the slave is guaranteed to accept in a single cycle, without the need for acknowledgement of acceptance. Credits are classified by credit-type. Credits are possessed and spent by the master. Credits are returned by the slave after enough processing has occurred to allow a new transaction of the same credit-type to be initiated by the master.

Credit-type: A generically defined, but specifically implemented categorization of credits used by the master to identify the kind of credit being spent or returned. A credit-type will typically be associated with a specific physical resource in the slave agent. The number of individually allocable slots of a resource that are available to the master is exactly equal to the number of available credits for that credit-type. The master and the slave must have an agreement on the exact definition of each generic credit-type.

Credit-count: The current number of credits of a given credit-type available to the master to be spent.

Credit-spend: The action of initiating a transaction on a Transaction Attribute Channel (TAC) via the assertion of a cvalid signal, which identifies a valid transaction on the TAC, and the assertion of one or more valid credit types on the ccredit[CFG:0] signal. The master must have a credit-count of at least one for each associated credit-type before a credit-spend is permitted. The master must decrement the associated credit-type by one for each credit-spend. A credit-spend is equivalent to a command request with an implicit command ready. As noted below there may be a number of differing types of credits. The credit-spend must be of a credit type corresponding to the transaction. In addition the credit-spend must include a number of credits sufficient to support the transaction. Thus in the case of a data transfer, the number of credits expended by the master may correspond to the data length and the buffer capacity of the receiving slave.

Credit-return: The action of returning a credit from the slave to the master in response to a previous credit-spend. The master increments the associated credit-type in response to a credit-return.

Credit-limit: The maximum number of credits for a specific credit-type available to the master upon reset. The credit-limit represents the maximum number of individual credit-spend actions that can be initiated by the master prior to receiving a first credit-return.

Channel: A collection of signals on an interface that collectively serve a common purpose, such as describing a transaction or transferring data.

Credited channel: A channel that uses credits and which includes signaling for both credit-spend and credit-return.

Cacheability domain: The collection of caches, potentially at different levels of a cache hierarchy, for which a transaction may indicate that allocation is possible.

Shareability domain: The collection of caches, potentially at different levels of a cache hierarchy, with which a coherent transaction is expected to obey the rules of the coherence protocol.

The MBA protocol of this invention preferably provides signaling support for agents to implement a MESI hardware cache coherence protocol. The supported transaction types and response status signals are based on ARM AXI coherence extensions known as ACE. The coherence protocol provides for caches in the same Shareability domain to remain coherent by enforcing exclusive ownership at the cache line granularity before modifying data. A full treatment of the coherence protocol is outside the scope of this specification, but an executive summary is presented here to provide context for the coherence signaling used in the MBA protocol.

The standard MESI cache coherence protocol provides four states for a cache line: Modified; Exclusive; Shared; and Invalid.

Modified: A cache line having a modified state is modified with respect to main memory, and the cache line is not present in any other caches in the same shareability domain.

Exclusive: A cache line having an exclusive state is not modified with respect to main memory, but the cache line is not present in any other caches in the same shareability domain.

Shared: A cache line having a shared state is not modified with respect to main memory. The cache line may be present in other caches in the same shareability domain.

Invalid: A cache line having an invalid state is not present in the cache. Any data stored in such a cache line is invalid and should not be accessed.

Cache coherence support in the protocol requires the introduction of a number of dependence relationships between transactions. For example, a coherent ReadClean transaction may result in the generation of one or more CleanShared snoop transactions that must complete prior to the legal completion of the ReadClean transaction. In this case, the ReadClean is dependent on the CleanShared in order to complete. The ACE specification details a number of such dependence relationships relating to coherence extensions to the AXI protocol.

Dependence relationships create blocking scenarios, where one transaction must block until another transaction is complete. The order of coherent transactions also creates blocking scenarios. For instance, two coherent write transactions to an overlapping address must be ordered in some way. One write transaction is blocked by the other.

A deadlock is a situation in which a mutual dependence relationship exists that cannot be resolved. This can also be thought of as a loop in the dependence graph. Blocking rules must be established to prevent system deadlock. All transactions in the MBA protocol can be categorized as either a Blocking Transaction or a Non-blocking Transaction:

A blocking transaction is characterized by all of the following. A blocking transaction is allowed to generate one or more snoop command transactions. A blocking transaction is allowed to depend upon the completion of a snoop command transaction in order to complete. A blocking transaction is allowed to depend upon the completion of a Non-blocking Transaction in order to complete. A blocking transaction is allowed to depend upon the completion of a Blocking Transaction in order to complete.

A non-blocking transaction is characterized by all of the following. A non-blocking transaction is not allowed to generate snoop command transactions. A non-blocking transaction is allowed to depend upon the completion of a snoop command transaction. A non-blocking transaction is not allowed to depend upon the completion of a blocking transaction. A non-blocking transaction is allowed to depend upon the completion of a non-blocking transaction.

Table 6 below identifies each transaction in the MBA protocol as blocking or non-blocking.

A single MBA interface is divided into three distinct channels that operate together for a complete transaction with unidirectional dataflow from master to slave. The three MBA interface channels are summarized as follows. The Transaction Attribute Channel (TAC) is a Credited channel that specifies all attributes for a single transaction from master to slave. The Transaction Data Channel (TDC) is a non-credited channel used for data transfer from master to slave. Each TDC includes an ID matched to a transaction previously or concurrently initiated on the TAC. The Write Response Channel (WRC) is a credited channel used by the master to send write responses to the slave. Each WRC includes an ID matched to a transaction previously initiated transaction on opposite TAC in a Paired Interface Topology.

Figure 16:
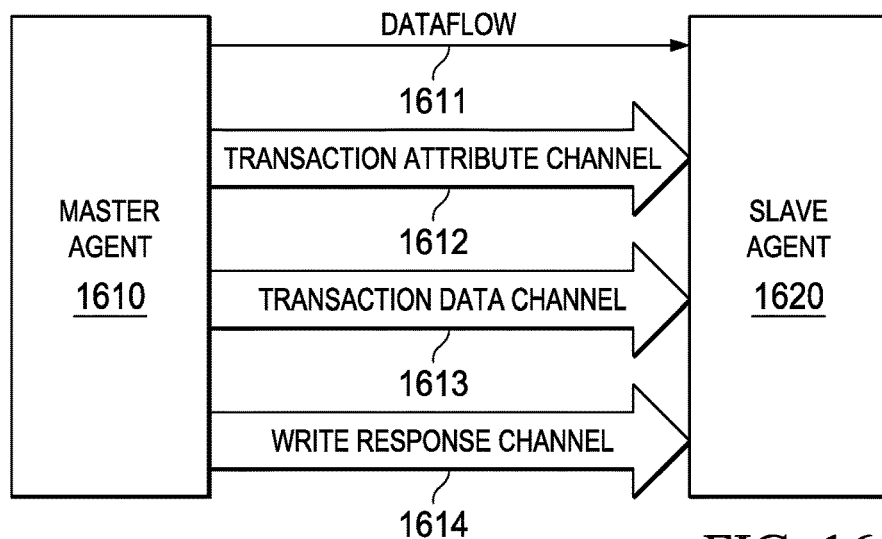
FIG. 16 illustrates the signal direction for each channel for a single multicore bus architecture interface of this invention.

FIG. 16 illustrates the signal direction for each channel for a single MBA interface. FIG. 16 includes master agent 1610 and slave agent 1620. As indicated by data flow 1611, master agent 1610 signals slave agent 1620. Master agent 1610 transmits signals to slave 1620 via TAC 1612, TDC 1613 and WRC 1614.

Figure 17:
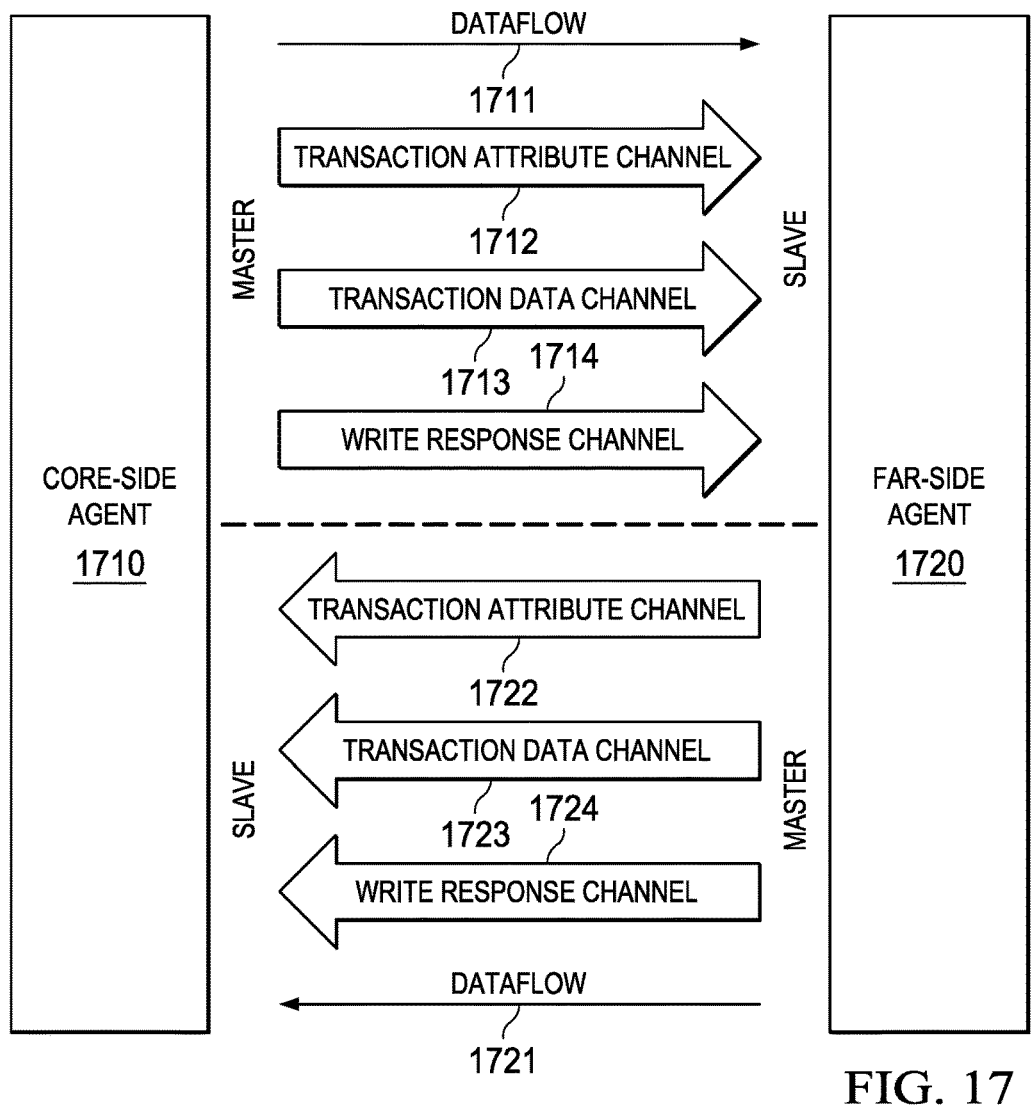
FIG. 17 illustrates each channel in an example paired interface topology of this invention.

FIG. 17 illustrates each channel in a paired interface topology (PIT). In order to perform a complete transaction sequence, an agent-pair must communicate using two separate MBA interfaces in a mirrored pair configuration.

This is referred to as a paired interface. The paired interface supports bidirectional data transfer between two agents. FIG. 17 illustrates core-side agent 1710 and far-side agent 1720. Core-side agent 1710 is the agent closer to the CPU core. Far-side agent 1720 is the agent farther from the CPU core. In paired interface topology, one agent is always the core-side agent and the other agent is always the far-side agent.

The first interface is used by core-side agent 1710 to initiate both command and response transactions to with far-side agent 1720 as indicated by dataflow 1711. In these transactions core-side agent 1710 is the master and far-side agent 1720 is the slave. Core-side agent 1710 transmits signals to far-side agent 1720 via TAC 1712, TDC 1713 and WRC 1714.

The second, mirrored interface is used by the far-side agent 1720 to initiate both command and response transactions to core-side agent 1710 as indicated by dataflow 1721. Far-side agent 1720 transmits signals to core-side agent 1710 via TAC 1722, TDC 1723 and WRC 1724.

Figure 18:
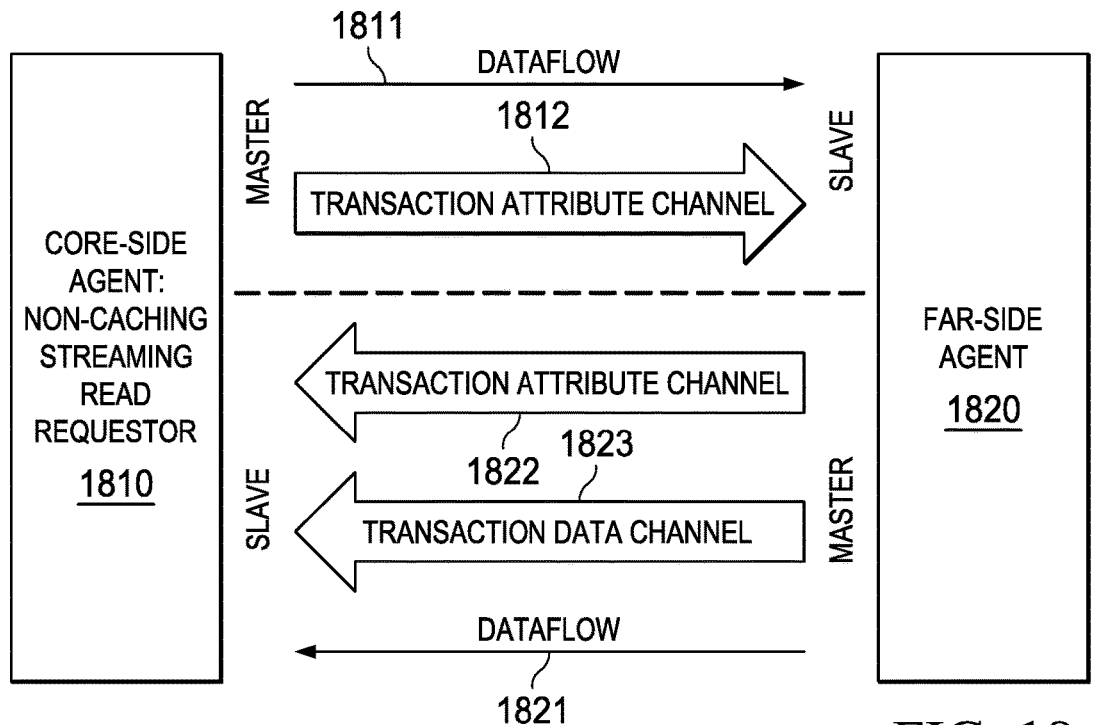
FIG. 18 illustrates each channel in another example paired interface topology.

FIG. 18 illustrates each channel in another example paired interface topology (PIT). FIG. 18 illustrates core-side agent 1810 and far-side agent 1820.

FIG. 18 below shows a paired interface topology. In this example is a read sequence. Core-side agent 1810 initiates a read operation on the interface while acting as master. Such a read operation does not require data transfer from core-side agent 1810 to far-side agent 1820. Thus no transaction data channel (TDC) is used by core-side agent 1810 for this sequence. According to dataflow 1811 core-side agent 1810 transmits signals as master to far-side agent 1820 via TAC 1712. To complete the transaction sequence, far-side agent 1820 initiates a read response transaction as master (per data flow 1821) via TAC 1822 and a supplies read data on TDC 1823.

The paired interface topology allows each agent to initiate both command and response transactions, transferring data as necessary to the other agent. Dataflow is restricted to a single direction from master to slave. For this reason, each agent acts as master on one interface and as slave on the second, mirrored interface.

The transaction attribute channel (TAC) is a Credited channel that specifies all the attributes necessary to initiate a single credited Transaction. All TAC signals that form transaction attributes are asserted by the master for exactly one cycle and must be accepted by the slave in the same cycle. Initiation of a transaction on the TAC requires the use of a credit. The use of credits guarantees that the slave has space in an internal physical resource to accept the transaction. As a consequence, the slave is required to accept every new transaction asserted on the TAC.

The master may initiate a new transaction every cycle, limited only by the credits available. Transactions may or may not require the transfer of data. If a transaction initiated on the TAC requires the transfer of data, the Transaction Data Channel (TDC) is used.

Every credit spent by the master with the assertion of cvalid has a credit type determined by the ccredit[CFG:0] signal. Upon successful removal of the transaction from the hardware resource, the slave must return a credit of the same type back to the master using the creturn[CFG:0] signal. Not all TAC signals are required for each interface. Table 5 lists the transaction attribute channel signals according to a preferred embodiment of this invention.

TABLE 5

| Signal | Size Bits | Description | Required/ Optional | Driver |
| --- | --- | --- | --- | --- |
| cvalid | 1 | Indicates presence of valid transaction | Required | Master |

TABLE 5-continued

| Signal | Size Bits | Description | Required/ Optional | Driver |
|---|---|---|---|---|
| ccredit | CFG | Credit spend bit vector. Indicates the kind of credit spent by the transaction | Required | Master |
| cid | 12 | Transaction ID | Required | Master |
| ctype | 6 | Transaction type | Required | Master |
| cmstid | 12 | Master ID | Optional | Master |
| cdata | 1 | Indicates whether transaction has associated data | Optional | Master |
| cpriority | 3 | Priority level of transaction | Optional | Master |
| csband | CFG | User defined sideband signal not mirrored in response | Optional | Master |
| cmsband | CFG | User defined sideband signal mirrored in response | Optional | Master |
| caddress | 48 | Transaction address | Optional | Master |
| cmemtype | 2 | Memory type of transaction (MMU) | Optional | Master |
| cpable | 1 | Indicates if prefetchable (MMU) | Optional | Master |
| ccinner | 2 | Cache allocation policy for inner cacheability domain (MMU) | Optional | Master |
| ccouter | 2 | Cache allocation policy for outer cacheability domain (MMU) | Optional | Master |
| csdomain | 1 | Indicates shareability domain (MMU) | Optional | Master |
| cbytecnt | 7 | Transaction size in bytes | Optional | Master |
| cemudbg | 1 | Transaction emulation level | Optional | Master |
| csecure | 1 | Master secure level | Optional | Master |
| cpri | 1 | Master privilege level | Optional | Master |
| ccoh | 2 | Coherence state information | Optional | Master |
| cdirty | 1 | Coherence dirty line status | Optional | Master |
| cstatus | 2 | Response success/ failure status | Optional | Master |
| ctrace | 4 | Transaction trace information | Optional | Master |
| creturn | CFG | Credit return vector, one bit for each credit type | Required | Slave |

The signals cvalid, ccredit, cid, ctype, cmstid, cdata, cpriority and csband may be used in all transactions. The signals caddress, cmemtype, cpable, ccinner, ccouter, csdomain, cbytecnt, cemudbg and csecure may only be used in command transactions. The signals ccoh, cdirty, cstatus and ctrace may only be used in response transactions. The signal creturn may only be used in credit return transactions.

The following is signal descriptions the above noted signals on the transaction attribute channel. As noted in Table 5 some signals are designated required and some are designated optional. Required signals must be present if the channel is present on the interface. If an entire channel is removed through configuration, then the required/optional designator is not applicable.

The cvalid signal identifies the presence of a valid transaction on the TAC. A 0 indicated no transaction. A 1 indicates a valid transaction is on the bus.

The ccredit[CFG:0] signal is a bit-vector that identifies the credit(s) being spent by this transaction. The number of available credit types, and therefore the width of this signal, is a configuration option. In the preferred embodiment the MBA protocol defines generic integer credit types. Credit types are unsigned integers numbered incrementally from zero. The width of the creturn[CFG:0] signal must match the width of ccredit. When cvalid is asserted to indicate the presence of a transaction on the Transaction Attribute Channel (TAC), ccredit is required to carry a non-zero value with at least one bit asserted to 1. More than one credit may be spent with a single transaction. This is accomplished by asserting more than one bit in the ccredit bit vector. The interpretation and mapping of credit types by master and slave to physical resources is implementation specific.

The caddress[47:0] signal identifies the starting address for the current transaction. Addresses may be a virtual address, a physical address or any other intermediate address representation. The address specifies the starting byte for the transaction for both aligned and non-aligned transactions. This signal is required on an interface where the master initiates command transactions.

The cmstid[11:0] signal uniquely identifies the system master initiating this transaction. The cmstid signal should be accurately propagated for transactions originating outside the current master to allow for accurate security protection checks.

The cid[11:0] signal uniquely identifies the current transaction. Command transactions establish the cid. Corresponding data transfers on the Transaction Data Channel (TDC) mirror the cid signal via the did[11:0] signal. Subsequent response transactions and write responses mirror the cid via the cid and wid[11:0] signals.

The ctype[5:0] signal identifies the type of the current transaction. Table 6 lists the preferred decoding of the 6 bit ctype signal. Transaction types are encoded with the 3 most significant bits identifying the category of transaction, and the 3 least significant bits identifying the specific type within the category.

TABLE 6

| ctype | Description | Category | Blocking/ Non-blocking |
|---|---|---|---|
| 000 000 | ReadNoSnoop | Read | Non-blocking |
| 000 001 | ReadOnce | Read | Blocking |
| 000 010 | ReadClean | Read | Blocking |
| 000 011 | ReadUnique | Read | Blocking |
| 001 000 | WriteNoSnoop | Write | Non-blocking |
| 001 001 | WriteUnique | Write | Blocking |
| 001 010 | WriteLineUnique | Write | Blocking |
| 001 011 | WriteClean | Write | Non-blocking |
| 001 100 | WriteBack | Write | Non-blocking |
| 010 000 | SnoopReadOnce | Snoop | Non-blocking |
| 010 001 | SnoopReadShared | Snoop | Non-blocking |
| 010 010 | SnoopCleanShared | Snoop | Non-blocking |
| 010 011 | SnoopCleanInvalid | Snoop | Non-blocking |
| 001 100 | SnoopMakeInvalid | Snoop | Non-blocking |
| 100 000 | DVMOperation | Message | Non-blocking |
| 100 001 | DVMSync | Message | Non-blocking |
| 100 010 | DVMComplete | Message | Non-blocking |
| 101 000 | CacheWarm | Message | Blocking |
| 101 001 | CacheWarmNotify | Message | Blocking |
| 101 010 | Reserved | | |
| 101 011 | Evict | Message | Non-Blocking |
| 110 000 | CleanSharedPOU | Maintenance | Blocking |
| 110 001 | CleanInvalidPOU | Maintenance | Blocking |
| 110 010 | MakeInvalidPOU | Maintenance | Blocking |
| 111 000 | Read Response | Response | Non-blocking |
| 111 001 | Snoop Response | Response | Non-blocking |
| 111 010 | Message Response | Response | Non-blocking |
| 111 011 | Maintenance Response | Response | Non-blocking |

All other possible codings are Reserved and not used in the preferred embodiment.

The cmemtype[1:0] signal identifies the memory type for the given transaction address, as determined by the virtual memory translation. The three supported memory types have different behavioral semantics. A coding of 00 denotes the device memory type. A coding of 01 denotes a normal writeback cache memory type. A coding of 10 denotes a normal writethrough cache memory type. A coding of 11 is reserved and not used in the preferred embodiment.

The cpable signal identifies whether the transaction address is prefetchable, as determined by the virtual memory translation. Memory regions marked prefetchable may contribute to the initiation of hardware prefetch streams. A 0 denotes non-prefetchable. A 1 denotes prefetchable.

The ccinner[1:0] signal type identifies the cache allocation attributes corresponding to the inner cacheability domain for the transaction address as determined by the virtual memory translation.

The ccouter[1:0] signal identifies the cache allocation attributes corresponding to the outer cacheability domain for the transaction address as determined by the virtual memory translation.

The cache hierarchy (level 1, level 2, level 3 caches, etc.) is divided into two mutually exclusive cacheability domains, the inner domain and the outer domain. The cache allocation policy is established separately for each domain, and recorded in the memory attributes stored by the virtual memory translation. The inner cacheability domain includes the cache(s) closest to the CPU, typically the level 1 and level 2 caches. The outer cacheability domain excludes the cache(s) in the inner domain and includes the caches beyond the inner domain, such as a last level cache. The interpretation of inner and outer cache domains is implementation dependent and some implementations may choose to treat both domains as identical.

Table 7 lists the codings of ccinner and ccouter which are identical.

TABLE 7

| ccinner, ccouter coding | Allocation Policy | Description |
| --- | --- | --- |
| 00 | Non-allocate | Caches in the domain must not allocate. |
| 01 | Write allocate | Writes allocate. Reads must not allocate. |
| 10 | Read allocate | Reads allocate. Writes must not allocate. |
| 11 | Read/write allocate | Reads and Writes allocate. |

The csdomain signal identifies the shareability domain, inner or outer, for the transaction as determined by the virtual memory translation. The shareability domain identifies the caches that must be kept coherent for this transaction.

There are two shareability domains: inner and outer. The two domains are not mutually exclusive. The outer domain includes the caches in the inner domain. The inner shared domain includes the cache(s) closest to the CPU, typically the level 1 and level 2 caches. The outer shared domain includes the cache(s) in the inner domain as well as beyond the inner domain, such as a last level cache. The interpretation of inner and outer share domains is implementation dependent, and some implementations may choose to treat both domains as identical. A 0 indicates the inner shared domain. A 1 indicates the outer shared domain. The csdomain is only valid for sharable transactions. The csdomain signal is ignored for ReadNoSnoop and WriteNoSnoop transaction types.

The ccoh[1:0] signal identifies the coherence state information for a ReadResponse or SnoopResponse transaction. The coherence state information is used to inform the initiating master of the final coherent state of the cache line. For read response transactions, ccoh indicates the coherent state of the line in the allocating cache when the read has completed. For snoop response transactions, ccoh indicates the coherent state of the line in the snooped cache when the snoop has completed. Table 8 lists the valid encodings of ccoh.

TABLE 8

| ccoh coding | Read Response | Snoop Response |
| --- | --- | --- |
| 00 | Non-coherent or non-allocating response. | The final state of the cache line snooped is Invalid. |
| 01 | Cache line is returned in the Shared state. | The final state of the cache line snooped is Shared. |
| 10 | Cache line is returned in the Unique state. | The final state of the cache line snooped is Unique. |
| 11 | Reserved | |

The cdirty signal identifies whether the cache line data transfer associated with this response transaction is dirty or clean with respect to main memory. The cdirty signal is used to indicate to the snooping master whether the snoop response data needs to be written back to main memory. The cdirty signal optionally may be used with read operations to implement the SharedDirty MESI state. The cdirty signal only applies to response transactions and carries no meaning for command transactions and must be tied to 0 for command transactions. A 0 cdirty signal indicates the cache line data transfer is unchanged relative to main memory. A 1 cdirty signal indicates the cache line data transfer differs from main memory. This indicates this cache line must be written back to main memory at some later time.

The cdata signal identifies whether this transaction is accompanied by an associated data transfer. Read operations will not assert this signal because no read operation includes a data transfer. The subsequent Read Response transaction will assert the cdata signal. A 0 cdata signal indicates the transaction does not include transfer data. A 1 cdat2 signal indicates the transaction does include associated data. Thus Write command transactions are required to assert cdata=1. Read response transactions are required to assert cdata=1 regardless of the status indicated in cstatus[1:0].

The cbytecnt[6:0] signal identifies the total size of the transaction. The maximum legal size is 128 bytes. A cbytecnt of all zeroes indicates a 128 byte transaction. This coding of cbytecnt is required for Snoop and Victim transactions. Otherwise the number of the cbytecnt signal equals the number of data transfer bytes. A transaction of zero size cannot be specified by the cbytecnt signal. Write transactions may, however, zero out the dbyten[CFG:0] signal on the TDC to perform write transactions that do not modify any bytes.

The cstatus[1:0] signal identifies the transaction completion status for a response transaction. This signal is only valid for response transactions and is ignored for command transactions. Table 9 lists the valid encodings.

TABLE 9

| cstatus coding | Description | Notes |
| --- | --- | --- |
| 00 | Success | |
| 01 | Failed due to address error | Invalid address, SRAM of MMR |

TABLE 9-continued

| cstatus coding | Description | Notes |
|---|---|---|
| 10 | Failed due to EDC error | Non-correctable data error |
| 11 | Failed due to protection error | Security/firewall violation, MMR protection error. |

The ctrace[3:0] signal identifies trace information for a read response transaction. This information is used by the emulation/debug architecture. The trace information records the level in the memory hierarchy where the transaction was serviced. Trace information is recorded irrespective of the success/failure status of the transaction. Success/failure status is captured in the cstatus[1:0] signal. The signal encodings are defined to match those specified by the emulation/debug architecture specification. Table 10 lists the valid encodings.

TABLE 10

| ctrace | Endpoint | Debugger Mnemonic |
|---|---|---|
| 0000 | CPU Register | OT |
| 0001 | L1P and L1D Cache | CB |
| 0010 | L1P Cache | CP |
| 0011 | L1D Cache | CD |
| 0100 | L2 Cache | C2 |
| 0101 | Reserved | |
| 0110 | Reserved | |
| 0111 | L2 Memory | M2 |
| 1000 | L3 Cache | C3 |
| 1001 | Shared L2 SRAM | SL2 |
| 1010 | Long Distance Port | LD |
| 1011 | External to MSMC | XT |
| 1100 | Reserved | |
| 1101 | Reserved | |
| 1110 | Reserved | |
| 1111 | Reserved | |

The cemudbg signal identifies the current transaction as either an emulation transaction or a non-emulation transaction. A 0 cemudbg signal indicates a normal, non-emulation transaction. A 1 cemudbg signal indicates an emulation transaction.

The csecure signal identifies the security level of the current transaction. A 0 csecure signal indicates a non-secure transaction. A 1 csecure signal indicates a secure transaction.

The cpriv[1:0] signal identifies the privilege level of the current transaction. Table 11 lists the valid encodings.

TABLE 11

| cpriv encoding | Description |
|---|---|
| 00 | User |
| 01 | Supervisor |
| 10 | Hypervisor |
| 11 | Reserved |

The cpriority[2:0] signal identifies the priority level of the current transaction. This signal is used by the slave to arbitrate the transaction. Lower numerical value indicates higher priority. Thus a cpriority[2:0] signal of 000 indicates the highest priority and a cpriority[2:0] signal of 111 indicates the lowest priority.

The csband[CFG:0] signal is an optional user defined sideband signal that is not mirrored on the response. This signal is optional, and its interpretation is implementation specific. The csband signal is used only by the Transaction Attribute Channel (TAC) and is not required to be mirrored back as part of a Transaction Sequence operation.

The cmsband[CFG:0] signal is an optional user defined sideband signal that must be mirrored on the response. This signal is optional, and its interpretation is implementation specific. The cmsband signal for a command transaction must be mirrored with the same value when the response transaction is asserted as part of a Transaction Sequence operation.

The creturn[CFG:0] signal identifies the credit type(s) for which a single credit is being returned this cycle. The number of available credit types, therefore the width of this signal is a configuration option. The MBA protocol defines generic integer credit types. The interpretation of credit types by master and slave is implementation specific. The creturn signal width exactly matches the number of possible credit types. The creturn signal is interpreted as a bit-vector with one bit for each credit type in use on the interface. Each bit of the creturn signal may be asserted independently by the slave each cycle. A value of 1 on any bit in the creturn signal indicates the return of a single credit of that type from the slave to the master. If more than one bit in the creturn signal is asserted in a cycle, one credit is returned from the slave to the master for each bit asserted in the signal. For each credit type on an interface, at most one credit can be returned each cycle from the slave to the master.

The transaction data channel (TDC) is a non-credited channel used to perform a data transfer from the master to the slave for a transaction initiated on the Transaction Attribute Channel (TAC). The TDC is mastered independently from the TAC. The two channels are linked via the cid[11:0] signal present in the TAC and the did[11:0] signal present in the TDC. A data transfer is divided into one or more data phases. The signals on the TDC are asserted by the master for exactly one cycle for each data phase and must be accepted by the slave in the same cycle.

Individual data phases within a data transfer on the TDC are required to occur in strict linear order but are not required to occur in consecutive cycles (e.g. a burst). Empty cycles between data phases are allowed on the TDC. The final data phase for a single transaction is indicated by the assertion of the dlast signal. To improve overall utilization of the TDC, the master may interleave data phases from different transactions as long as data phases within a data transfer occur in strict linear order. The size of the data window, and thus the ddata signal, is configurable to the following widths: 64, 128, 256, 512 bits. The default is 512 bits. Each data phase may transfer either a full or partial data window as indicated by the dbyten[CFG:0] signal. Not all TDC signals are required for each interface. Table 12 lists the signals of the Transaction Data Channel.

TABLE 12

| Signal | Size Bits | Description | Required/ Optional |
|---|---|---|---|
| dvalid | 1 | Indicates the presence of valid data | Required |
| did | 12 | Transaction ID for current data transfer | Required |
| dtype | 1 | Indicates whether data transfer corresponds to a command or response | Required |

TABLE 12-continued

| Signal | Size Bits | Description | Required/ Optional |
|---|---|---|---|
| dlast | 1 | Indicates the last data phase of a current data transfer | Required |
| ddata | CFG (512) | Data for current phase | Required |
| dword | CFG (1) | Indicates the data window in the total data transfer of the current phase | Required |
| dmstid | 12 | Master ID for current data transfer | Optional |
| dbyten | CFG (64) | Indicates valid data for the entire data window in the current cycle | Optional |
| dparity | CFG (16) | Parity vector generates per 32 bit datum for entire data window | Optional |
| dedc | CFG (20) | EDC Hamming and parity data fields computed on a 256-bit granularity. Multiples of 10-bit fields, 10-bits per 256-but datum | Optional |
| dsband | CFG | User defined sideband signal | Optional |
| dstatus | 2 | Response success/failure per data phase | Optional |

For the size column of Table 12 CFG indicates the size of this signal is configurable. The number in parenthesis is the default size in bits. The size of the dword, dparity and dedc signals are derived from the size of the ddata signal. The dword signal width is determined based on both the configured data window size and the maximum data transfer of 128 bytes (1024 bits). The maximum data transfer size is fixed at 128 bytes regardless of the size of the data window.

The dvalid signal identifies the presence of a valid data phase on the TDC for a transaction initiated in either the same or a previous cycle on the Transaction Attribute Channel (TAC). A dvalid signal of 0 indicates that no data is in the present cycle. A dvalid signal of 1 indicates that the present cycle includes valid data.

The did[11:0] signal uniquely identifies the TAC transaction corresponding to the current data transfer. The did[11:0] signal must be the same for every data phase in a data transfer, though data phases for different data transfers may be interleaved.

The dtype signal identifies whether the data transfer corresponds to a command or response transaction. This information is necessary to uniquely distinguish command and response data transfers that share both the same master dmstid[11:0] and did[11:0]. A dtype signal of 0 indicates that the present transaction is a command transaction. A dtype signal of 1 indicates that the present transaction is a response transaction.

The dlast signal identifies whether the current data transfer is the last data of a current bus transaction. The data of a current bus transaction may be too large to transmit on the available lines of the data bus. In this case the data is transferred in a number of cycles. A dlast signal of 0 indicates that the present transaction is a not the last data transfer. A dlast signal of 1 indicates that the present transaction is the last data transfer.

The dstatus[1:0] identifies the data status for the current data transfer. This signal is only applicable for response transactions and is ignored for write command transactions. This signal is asserted separately for each data phase in a data transfer. This signal is not required to be the same for each data phase in a data transfer. This allows fragmented read returns to return a separate status for each data phase. The dstatus signal has the same coding as the cstatus signal listed in Table 9.

The dbyten[CFG:0] signal identifies the valid byte lanes in the ddata[CFG:0] window for the current data phase. Every valid byte on the ddata[CFG:0] bus is identified by a 1 in the corresponding bit of the dbyten bit-vector. A dbyten of all zeroes indicates that no valid data is being transferred in the current data phase. The dbyten signal may serve as either write byten for write command transactions or read byten for read return/snoop return transactions and is required to be valid for every cycle in which dvalid is asserted. Gappy data phases are supported for write command transactions, where the dbyten signal has zeroes in-between consecutive ones. This is intended for write buffer flushes and partial line writes for cache transactions. The dbyten signal is optional. If the dbyten signal is not present every byte lane is assumed valid for each data phase in a data transfer.

The ddata[CFG:0] signal identifies the data for the current data phase. Data bytes are aligned to a fixed byte lane by address, and all data is qualified by the dbyten[CFG:0] bit-vector. Non-aligned data or gappy data (e.g. write merge data) is indicated by setting the necessary bits in the dbyten [CFG:0] bit-vector.

The dword[CFG:0] signal identifies the data window in the overall data transfer to which the current data phase applies. Data transfers larger than the size of the data window will require multiple data phases. The dword signal is used to identify the data window to which the current ddata[CFG:0] and dbyten[CFG:0] signals apply. Data transfers are required to occur in linear order. Thus the dword signal is required to be monotonically increasing through the data transfer. The dword signal cannot decrease in value in successive data phases in the data transfer. Fragmented read returns from a master that come across a lower-width downstream data bus will result in dword holding a consistent value for multiple data phases until the boundary of the data window is reached. Data phases that span a data window are not allowed, as the dword signal cannot uniquely distinguish which data bytes in the current data phase correspond to which data window in the overall data transfer.

The dmstid[11:0] signal uniquely identifies the master that initiated the transaction to which this data transfer belongs. The dmstid must match the cmstid of the original transaction on the Transaction Attribute Channel (TAC).

The dlast signal identifies the final data phase in a data transfer for a given did[11:0].

The dparity[CFG:0] signal identifies the parity for the current ddata[CFG:0] window. The parity is computed as an XOR-reduction of the ddata per 32 bit subline. Table 13 lists the encoding of the dparity signal for up to a 512 bit data window.

TABLE 13

| dparity subfield | Notes |
|---|---|
| dparity[15] | XOR reduction of ddata[511:480] |
| dparity[14] | XOR reduction of ddata[479:448] |
| dparity[13] | XOR reduction of ddata[447:416] |
| dparity[12] | XOR reduction of ddata[415:384] |
| dparity[11] | XOR reduction of ddata[383:352] |
| dparity[10] | XOR reduction of ddata[351:320] |
| dparity[9] | XOR reduction of ddata[319:288] |
| dparity[8] | XOR reduction of ddata[287:256] |
| dparity[7] | XOR reduction of ddata[255:224] |

TABLE 13-continued

| dparity subfield | Notes |
| --- | --- |
| dparity[6] | XOR reduction of ddata[223:192] |
| dparity[5] | XOR reduction of ddata[191:160] |
| dparity[4] | XOR reduction of ddata[159:128] |
| dparity[3] | XOR reduction of ddata[127:96] |
| dparity[2] | XOR reduction of ddata[95:64] |
| dparity[1] | XOR reduction of ddata[63:32] |
| dparity[0] | XOR reduction of ddata[31:0] |

Fragmented data transfers may transfer a full data window via multiple data phases. For each data phase in a fragmented data transfer dbyten[CFG:0] will specify the subset of the total data window that is being transferred. Each data phase must compute dparity on the full data window, zeroing out data bytes that correspond to zeroed dbyten bits. This allows the slave to reconstitute the correct dparity value for a complete data window by performing a successive XOR of the intermediate dparity values from each data phase.

The dedc[CFG:0] signal identifies the error detection/correction hamming and parity information for the current data phase. The dedc signal is composed of two 10 bit fields, each calculated on a 256 bit data granularity. Each 10 bit field is composed of a 9 bit hamming syndrome and a single all-parity bit. Table 14 lists the encoding of the dedc signal.

TABLE 14

| dedc subfield | Description | Notes |
| --- | --- | --- |
| dedc[19] | Upper All Parity | XOR reduction of {ddata[511:256],dedc[18:10]} |
| dedc[18:10] | Upper Hamming | Computed from ddata[511:256] |
| dedc[9] | Lower All Parity | XOR reduction of {ddata[255:0],dedc[8:0]} |
| dedc[8:0] | Lower Hamming | Computed from ddata[255:0] |

The dedc signal cannot be used on an interface where the data window is configured as smaller than 256 bits.

Figure 19:
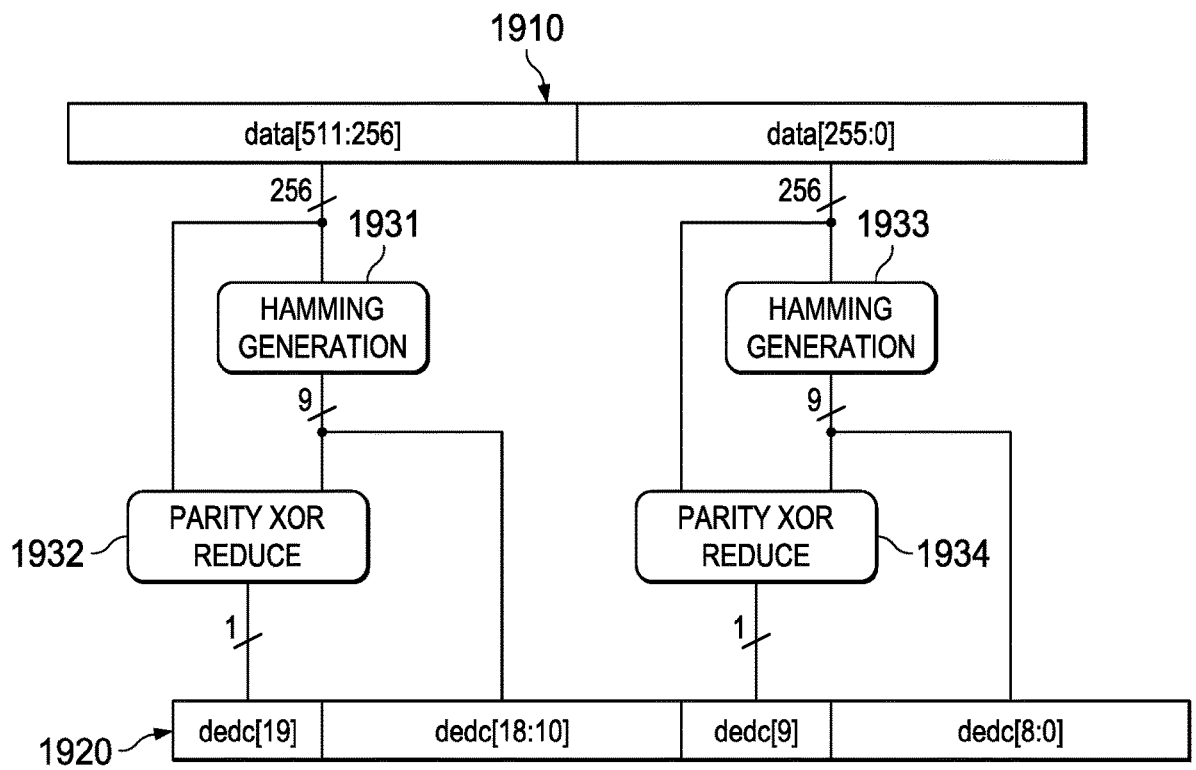
FIG. 19 illustrates the logic for the encoding of the dedc signal.

FIG. 19 illustrates the logic for the encoding of the dedc signal. The data 1910 is divided into two parts: data[511:256]; and data[255:0]. Hamming generator 1931 receives data[511:256] of data 1910 and forms 9 bits of Hamming data in accordance with the known art. This 9 bits becomes dedc[18:10] of data 1920. Parity XOR reduce 1932 forms a combined exclusive OR of the data bits data[511:256] and the 9 bits of Hamming data from Hamming generator 1931. This single XOR bit becomes dedc[19] of data 1920. Hamming generator 1933 receives data[255:0] of data 1910 and forms 9 bits of Hamming data in accordance with the known art. This 9 bits becomes dedc[8:0] of data 1920. Parity XOR reduce 1934 forms a combined exclusive OR of the data bits data[255:0] and the 9 bits of Hamming data from Hamming generator 1933. This single XOR bit becomes dedc[9] of data 1920.

Fragmented data transfers may transfer a full data window via multiple data phases. For each data phase in a fragmented data transfer, dbyten[CFG:0] will specify the subset of the total data window that is being transferred. Each data phase must compute dedc on the full data window, zeroing out data bytes that correspond to zeroed dbyten bits. This allows the slave to reconstitute the correct dedc value for a complete data window by performing a successive XOR of the intermediate dedc values from each data phase.

The dsband[CFG:0] signal is a user defined sideband signal. This signal is optional and its interpretation is implementation specific. The dsband signal is used only by the Transaction Data Channel (TDC).

The write response channel (WRC) is a Credited channel used by the master to return write status to the slave for a previously initiated write command transaction on the opposite MBA interface for a Paired Interface Topology. Initiation of a write response on the WRC requires the use of a credit. The WRC signals are asserted by the master for exactly one cycle and must be accepted by the slave in the cycle they are asserted. Each write status is uniquely identified by a wid[11:0] signal which matches the cid[11:0] of the original write command transaction. Write response credits must be returned by the slave to the master using the wreturn signal upon successful processing of the write response. All signals on the WRC are required if the channel is present, though the entire channel may be excluded if there is no need for write responses.

Table 15 lists the Write Response Channel Signals.

TABLE 15

| Signal | Size | Use | Description | Driver |
| --- | --- | --- | --- | --- |
| wvalid | 1 | Write Response | Indicates the presence of a write response | Master |
| wid | 12 | Write Response | Loopback ID for dedicated write response interface | Master |
| wstatus | 2 | Write Response | Write Status for dedicated write response interface | Master |
| wmstid | 12 | Write Response | Loopback Master ID for write response | Master |
| wreturn | 1 | Credit Return | Credit return strobe | Slave |

The wmstid[11:0] signal is the only optional signal on the WRC. The entire write response channel may be configured to be present or absent, depending on whether or not the interface supports write command transactions.

The wvalid signal indicates the presence of a valid write response. A 0 indicates no write response is present. A 1 indicates a valid write response for the current cycle.

The wid[11:0] signal uniquely identifies the original TAC transaction for which this is the write response. The wid must match the cid of the original write command transaction.

The wstatus[1:0] signal identifies the status of the write transaction. The wstatus signal has the same codding as the cstatus listed in Table 9.

The wmstid[11:0] signal identifies the system master that originated the write command transaction for which this is the response. The wmstid must match the original cmstid of the write command transaction.

The wreturn signal indicates the return of a write response credit. A 0 indicates no write response credit return is present. A 1 indicates a valid write response credit return for the current cycle.

The MBA protocol defines multiple transaction types. Transactions are grouped into two basic categories, command and response. Both transaction categories are described below with a description of every transaction supported by the protocol.

A command transaction initiates a Transaction Sequence between two agents that may or may not involve the transfer of data. The sequence is completed in one of two ways: a write response initiated by the other agent on the Write Response Channel (WRC) of the opposite MBA interface; and a response transaction initiated by the other agent on the Transaction Attribute Channel (TAC) of the opposite MBA interface and its associated data transfer on its Transaction Data Channel (TDC). All command transactions must specify a unique cid[11:0]. The cid may not be in use by any active sequences initiated by the same master on the same interface. Write command transactions require the transfer of data from the master to the slave. All sequences other than write command sequences are completed by a response transaction initiated by the other agent on the opposite MBA interface.

Command transactions fall into four categories: demand; snoop; message; and maintenance. Table 16 lists the command transaction types in the demand category. All commands in Table 16 correspond to ACE equivalent transactions. The master column indicates the expected initiators for each transaction type. The sequence completion column indicates the required response to complete the sequence initiated by the command transaction.

TABLE 16

| Transaction Type | Description | Master | Sequence Completion |
|---|---|---|---|
| ReadNoSnoop | Read to non-shared memory region | Core-side, Far-side | ReadResponse (TAC) |
| ReadOnce | Read that does not allocate into cache | Core-side, Far-side | ReadResponse (TAC) |
| ReadClean | Read that allocates in the shared state | Core-side | ReadResponse (TAC) |
| ReadUnique | Read that allocates in the unique state | Core-side | ReadResponse (TAC) |
| WriteNoSnoop | Write to non-shared memory region | Core-side, Far-side | WriteResponse (WRC) |
| WriteUnique | Partial line write | Core-side, Far-side | WriteResponse (WRC) |
| WriteLineUnique | Full line write | Core-side, Far-side | WriteResponse (WRC) |
| WriteClean | Victim write flush to next level memory. Local cache retained and change to clean | Core-side | WriteResponse (WRC) |
| WriteBack | Victim write flush to next level memory. Local cache copy deleted | Core-side | WriteResponse (WRC) |

The ReadNoSnoop command is a non-coherent read operation. This read operation does not participate in the coherence protocol and does not generate s snoop transaction. The ReadNoSnoop transaction may or may not result in a cache allocation, depending on the values of the cmemtype [1:0], ccinner[1:0] and ccouter[1:0] signals.

The ReadOnce command is a coherent read operation that will not allocate into the cache in the initiating master.

The ReadClean command is a coherent read operation that will allocate into the cache in the initiating master. The initiating master is requesting the line in the Shared state but the far-side component may grant access in the Exclusive state.

The ReadUnique command is a coherent read operation that will allocate into the cache in the initiating master. The initiating master is requesting the line in the Exclusive state, the line must be granted in the exclusive state.

The WriteNoSnoop command is a non-coherent write operation. This write operation does not participate in the coherence protocol and does not generate a of snoop transaction.

The WriteUnique command is a coherent write operation with a size that may be less than a full cache line. The cache line for the transaction address must not be present in the cache in the initiating master.

The WriteLineUnique command is a coherent write operation with a size that must equal a full cache line. The cache line for the transaction address must not be present in the cache of the initiating master.

The WriteClean command is a possibly coherent victim write transaction where the line will be retained in the clean state in the cache of the initiating master.

The WriteBack command is a possibly coherent victim write transaction where the line will be not be retained in the cache in the initiating master.

Table 17 lists the command transaction types in the snoop category. The ACE equivalent transactions are: SnoopReadOnce, ReadOnce; SnoopReadShared, ReadShared; SnoopCleanShared, CleanShared; SnoopCleanInvalid, CleanInvalid; and SnoopMakeInvalid, MakeInvalid.

TABLE 17

| Transaction Type | Description | Master | Sequence Completion |
|---|---|---|---|
| SnoopReadOnce | Read from local cache with no state change | Far-side | SnoopResponse (TAC) |
| SnoopReadShared | Read from local cache and change state to shared | Far-side | SnoopResponse (TAC) |
| SnoopCleanShared | Read from local cache and change state to clean | Far-side | SnoopResponse (TAC) |
| SnoopCleanInvalid | Read and clean from local cache and change state to invalid | Far-side | SnoopResponse (TAC) |
| SnoopMakeInvalid | Remove from local cache, no data read returned | Far-side | SnoopResponse (TAC) |

The SnoopReadOnce command is a non-caching read snoop command that does not alter the state of the snooped cache. Data must be returned if the line is present in the snooped cache.

The SnoopReadShared command is a caching read snoop command that requires the snooped cache line to move to the Shared state upon completion. Data must be returned with the snoop response transaction if the line is present in the snooped cache.

The SnoopCleanShared command is a caching read snoop command that requires the snooped cache line to move to the clean state upon completion. Data must be returned with the snoop response transaction if the line is present in the snooped cache.

The SnoopCleanInvalid command is a caching read snoop command that requires the snooped cache line to move to the invalid state upon completion. Data must be returned with the snoop response transaction if the line is present in the snooped cache.

The SnoopMakeInvalid command is a caching snoop command that requires the snooped cache line to be moved to the invalid state upon completion. Data is never returned with the snoop response transaction.

Table 18 lists the command transaction types in the message category. The DVMOperatation command, the DVMSync command and the DVMCompleter command have ACE equivalent transactions. The CacheWarm command, the CacheWarmNotify command and the Evict command have no ACE equivalents. Message command transactions never include the transfer of data and therefore do not require the use of the Transaction Data Channel (TDC).

TABLE 18

| Transaction Type | Description | Master | Sequence Completion |
|---|---|---|---|
| DVMOperation | General DVM operation | Core-side Far-side | MessageResponse (TAC) |
| DVMSync | DVM sync requires all lower level components to send DVM complete before issuing its own DVM complete | Core-side Far-side | MessageResponse (TAC) |
| DVMComplete | DVM transaction complete | Core-side Far-side | MessageResponse (TAC) |
| CacheWarm | Message from far-side requiring core-side to initial ReadClean command | Far-side | MessageResponse (TAC) |
| CacheWarmNotify | Message from far-side requiring core-side to initial ReadClean command and send subsequent WriteSnoop upon completion of the allocate | Far-side | MessageResponse (TAC) |
| Evict | Local cache deletes data without flush | Core-side | MessageResponse (TAC) |

The CacheWarm command is a message requiring the slave agent to initiate an allocating ReadClean operation to allocate the given address into its cache. The Transaction Attribute Channel (TAC) attributes corresponding to memory type and memory attributes that can only be determined from the MMU must be mirrored from the CacheWarm transaction to the subsequent ReadClean operation. The CacheWarm transaction is used by the system to prefetch cache lines. The message response transaction may be initiated after the ReadClean operation is initiated.

The CacheWarmNotify command is a message requiring the slave agent to initiate an allocating ReadClean operation to allocate the given address into its cache. The Transaction Attribute Channel (TAC) attributes corresponding to memory type and memory attributes that can only be determined from the MMU must be mirrored from the CacheWarm transaction to the subsequent ReadClean operation. When the read response transaction is received for the ReadClean operation, the slave agent must initiate a WriteNoSnoop message command transaction to indicate completion of the cache warm operation.

The Evict command is a possibly coherent cache state notification that the given address has been removed (invalidated) from the cache in the initiating master.

The maintenance command transactions come in two flavors, distinguished by the maintenance domain. The two maintenance domains are as follows: Point of Unification (POU); and Point of Coherence (POC). The point of unification is the point at which the instruction and data caches are unified. This is typically the second level cache. The point of coherence is the point to which all coherent masters in a given coherence domain must write back modified data in order for it to be observed by other coherent masters in the same coherence domain. This is typically a last level cache.

TABLE 19

| Transaction Type | Description | Master | Sequence Completion |
|---|---|---|---|
| CleanSharedPOU | Requires local cache to flush dirty line to point of unification and change to shared state | Core-side | Maintenance Response (TAC) |
| CleanInvalidPOU | Requires local cache to flush dirty line to point of unification and invalidate | Core-side | Maintenance Response (TAC) |
| MakeInvalidPOU | Requires local cache to invalidate to point of unification | Core-side | Maintenance Response (TAC) |
| CleanSharedPOC | Requires local cache to flush dirty line to point of coherence and change to shared state | Core-side | Maintenance Response (TAC) |
| CleanInvalidPOC | Requires local cache to flush dirty line to point of coherence and invalidate | Core-side | Maintenance Response (TAC) |
| MakeInvalidPOC | Requires local cache to invalidate to point of coherence | Core-side | Maintenance Response (TAC) |

The CleanSharedPOU command is a cache maintenance operation requiring all caches from the core to the slave agent to write out the given cache line to the point of unification if it is held in the modified state. The CleanSharedPOU transaction must be propagated to all caches between the slave agent and the core, but may be done so through the SnoopCleanShared command transaction.

The CleanInvalidPOU command is a cache maintenance operation requiring all caches from the core to the slave agent to write out the given cache line to the point of unification if it is held in the modified state. All caches must also invalidate the cache line. The CleanInvalidPOU transaction must be propagated to caches closer to the core, but may be done so through the SnoopCleanInvalid command transaction.

The MakeInvalidPOU command is a cache maintenance operation requiring all caches from the core to the slave agent to invalidate the given cache line to the point of unification. The MakeInvalidPOU transaction must be propagated to caches closer to the core, but may be done so through the SnoopMakeInvalid command transaction.

The CleanSharedPOC command is a cache maintenance operation requiring all caches from the core to the slave agent to write out the given cache line to the point of coherence if it is held in the modified state. The CleanSharedPOC transaction must be propagated to all caches between the slave agent and the core, but may be done so through the SnoopCleanShared command transaction.

The CleanInvalidPOC command is a cache maintenance operation requiring all caches from the core to the slave agent to write out the given cache line to the point of coherence if it is held in the modified state. All caches must also invalidate the cache line. The CleanInvalidPOC transaction must be propagated to caches closer to the core, but may be done so through the SnoopCleanInvalid command transaction.

The MakeInvalidPOC command is a cache maintenance operation requiring all caches from the core to the slave agent to invalidate the given cache line to the point of coherence. The MakeInvalidPOC transaction must be propagated to caches closer to the core, but may be done so through the SnoopMakeInvalid command transaction.

Response transactions are used to complete a transaction sequence between two agents. Response transactions are required to match the cid[11:0] of the original command transaction. Response transactions may or may not be associated with a transfer of data. Table 20 lists the response transaction types. ACE equivalent transactions of: ReadResponse is RRESP; SnoopResponse is CR, CU; and there is no ACE equivalent to the MessageResponse and MaintenanceResponse commands. The master column indicates the expected initiators for each transaction type.

TABLE 20

| Command Type | Description | Master |
|---|---|---|
| ReadResponse | Read response with data and status | Core-side Far-side |
| SnoopResponse | Snoop response with data and status | Core-side |
| MessageResponse | Message is complete | Core-side Far-side |
| MaintenanceResponse | Maintenance is complete | Far-side |

A read response transaction is required to complete a read sequence. The read response transaction will always include a data transfer. Read response transactions that have a cstatus[1:0] value indicating a failure status must still assert the cdata signal and return zeroed data. Read response transactions that have a cstatus[1:0] value indicating success must include a data transfer on the Transaction Data Channel (TDC).

A snoop response transaction is required to complete a snoop sequence. The snoop response transaction may or may not include a data transfer. Snoop response transactions that have a cstatus[1:0] value indicating a failure status may deassert the cdata signal and prevent the use of the Transaction Data Channel (TDC). Snoop response transactions that have a cstatus[1:0] value indicating success must include a data transfer on the Transaction Data Channel (TDC).

A message response transaction is required to complete a message sequence. The message response transaction never includes a data transfer.

A maintenance response transaction is required to complete a maintenance sequence. The maintenance response transaction never includes a data transfer.

Response transactions indicate error status by asserting a corresponding cstatus[1:0] signal on the Transaction Attribute Channel (TAC). ReadResponse transactions are required to assert cdata signal of 1 regardless of the occurrence of an error while attempting to process the read operation.

Address and protection errors are typically detected before the slave performs an endpoint read access. In this case, a data transfer must still occur with the ReadResponse transaction. The full ReadResponse transaction with data transfer would occur as follows: A cdata signal of 1 must be asserted with the ReadResponse transaction on the Transaction Attribute Channel (TAC). A cstatus[1:0] signal indicates the kind of error that occurred, if any. This could be address errors and protection errors. A data transfer must occur on the Transaction Data Channel (TDC). The size of the data transfer must equal the cbytecnt[6:0] of the original read operation. The ddata[CFG:0] signal must be set to all zeroes to avoid a security hole that would allow sampling the previously registered data on this signal Data errors, such as non-correctable bit errors, may occur during a read access, possibly after the ReadResponse transaction has been initiated. If the error occurs after one or more data phases have been transferred, the data transfer must complete, and the erroneous data phases must be denoted by asserting the corresponding error kind on the dstatus[1:0] signal as well as setting ddata[CFG:0] to all zeroes for the erroneous data phase.

All MBA transactions operate through the use of credits. Transactions initiated on the Transaction Attribute Channel (TAC) and write responses initiated on the Write Response Channel (WRC) require the use of at least one credit. Credits are owned and spent by the master and subsequently returned by the slave. Write response credits have only one kind and do not require further classification. Transaction credits are organized into credit types. Most implementations of this invention will classify credit types by physical resources on the slave.

For all transactions, the ccredit[CFG:0] signal indicates the type of credit(s) being spent. This invention does not require a fixed number of credit types, nor fixed meanings of credit types defined. Specific implementations of this invention will configure the number of available credit types on an MBA interface, as well as the meaning associated with each credit type.

The credit handshake for a Credited channel is very simple and obeys the following temporal form: credit spend; followed by credit return. A Master spends one or more credits by asserting cvalid and asserting one or more bits in the ccredit[CFG:0] bit-vector. The corresponding Slave accepts the transaction on the same cycle. This is mandatory. If a master has a credit to spend this indicates that the slave must accept the transaction. The slave completes the transaction and then frees the resource or resources used by the transaction. Upon freeing a resource, the slave and returns the credit(s) to the master by asserting the corresponding bit(s) in the creturn[CFG:0] bit-vector. The master then has the credit for later use.

Figure 20:
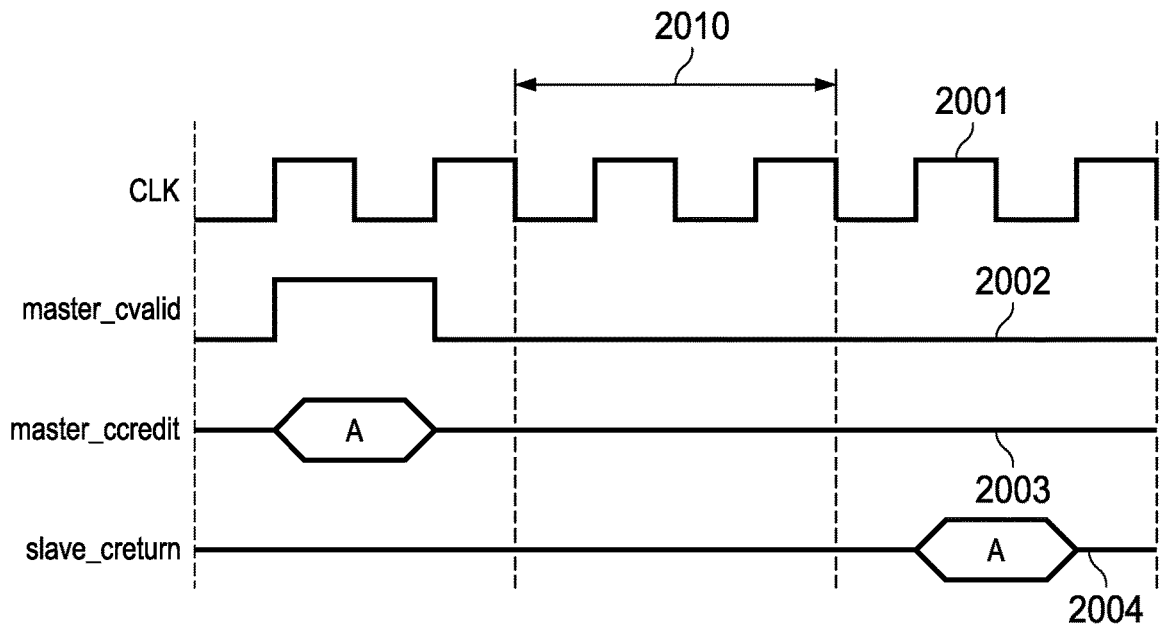
FIG. 20 illustrates a simple credit handshake for the transaction attribute channel.

FIG. 20 illustrates a simple credit handshake for the Transaction Attribute Channel (TAC). In FIG. 20 2001 is the clock signal controlling both the master and the slave. The master produces an active cvalid signal 2002 for one clock cycle to initiate the transaction. The master also produces a ccredit signal A 2003 during the same one clock cycle. This ccredit signal A 2003 indicates the type credit being spent on the current transaction. According to this invention, if the master has a credit to spend the slave must accept the transaction. The slave thus accepts the transaction and operates an indeterminate time 2010. Upon completion of processing required by the accepted transaction, the slave returns the credit via a creturn signal A 2004. This creturn signal A 2004 preferably has a length of one clock cycle.

There is a one to one mapping of credit-spend to credit-return actions on a credited channel in this invention. There may be multiple credit handshakes in progress on the same channel at the same time. The master is responsible for keeping track of the number of credits in its possession. Every credit-spend action decrements the credit count in the master by one. Every credit-return action increments the credit count in the master by one.

Credit-spend and credit-return actions may be interleaved on the same credited channel for different handshakes for the same or different credit types.

Figure 21:
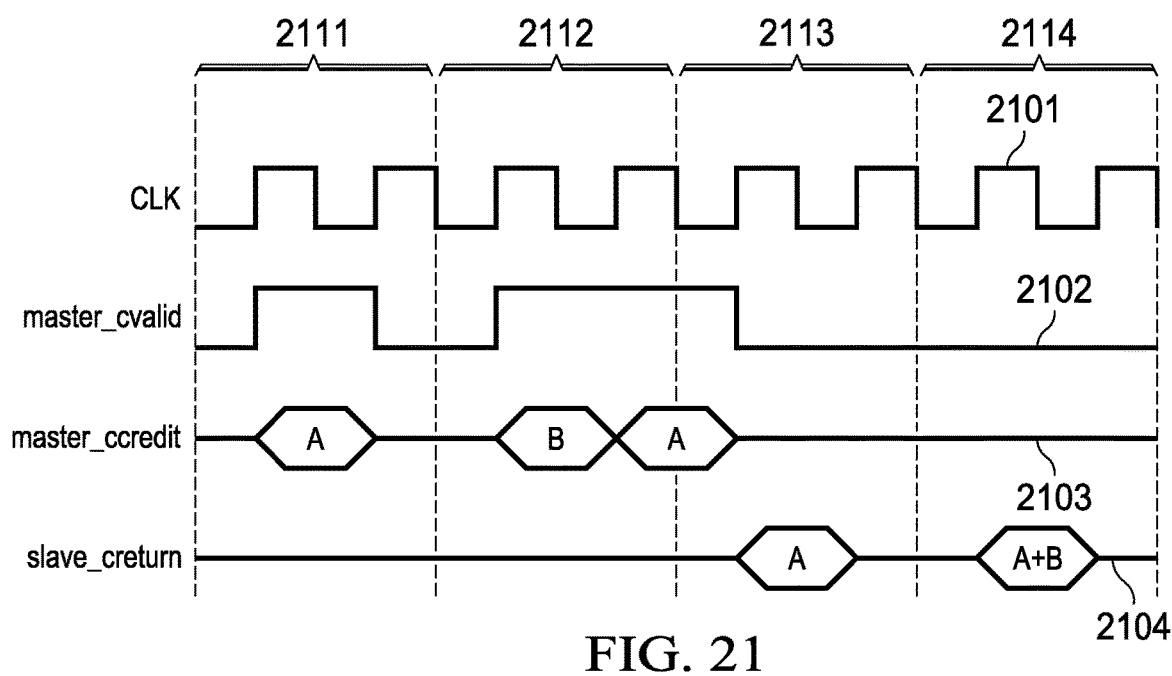
FIG. 21 illustrates interleaved credit handshakes on the same channel.

FIG. 21 illustrates interleaved credit handshakes on the same channel. In FIG. 21 2101 is the clock signal controlling both the master and the slave. The master produces an active cvalid signal 2102 for one clock cycle 2111 to initiate a first transaction. The master also produces a ccredit signal A 2103 during the same clock cycle 2111. This ccredit signal A 2003 indicates the type credit being spent on the current transaction. During two clock cycles 2112 the master transmits ccredit signal B 2103 followed by ccredit signal A 2103. These ccredit signals are within the period of a with a two clock cycle cvalid signal 2102. Note that the master transmitted a second ccredit signal A 2103 before a credit return from the slave. This only occurs if the master originally had at least two credits of type A. This in turn requires that the slave originally had the capacity to accept a second request of type A before completing the first such transaction. The slave thus accepts the first transaction type A. Upon completion of processing required by the first accepted transaction, the slave returns the credit via a creturn signal A 2104 during time 2113. This creturn signal A 2104 preferably has a length of one clock cycle. Upon completion of processing required by the second accepted transaction (type B) and the third accepted transaction (type A), the slave returns two credits via a creturn signal A+B 2104 during time 2114. In the preferred embodiment the credit return is encoded as a bit-vector with one bit for each credit type in use on the channel. Setting of the bits for both type A and for type B permits a single credit return signal to return both credit types.

FIG. 17 illustrates each channel in a paired interface topology (PIT). In order to perform a complete transaction sequence, an agent-pair must communicate using two separate MBA interfaces in a mirrored pair configuration. This is referred to as a paired interface. The paired interface supports bidirectional data transfer between two agents. All credited sequences between agents A and B will obey one of three forms: credited non-write sequence; credited write sequence; and credited DVM sequence.

Figure 22:
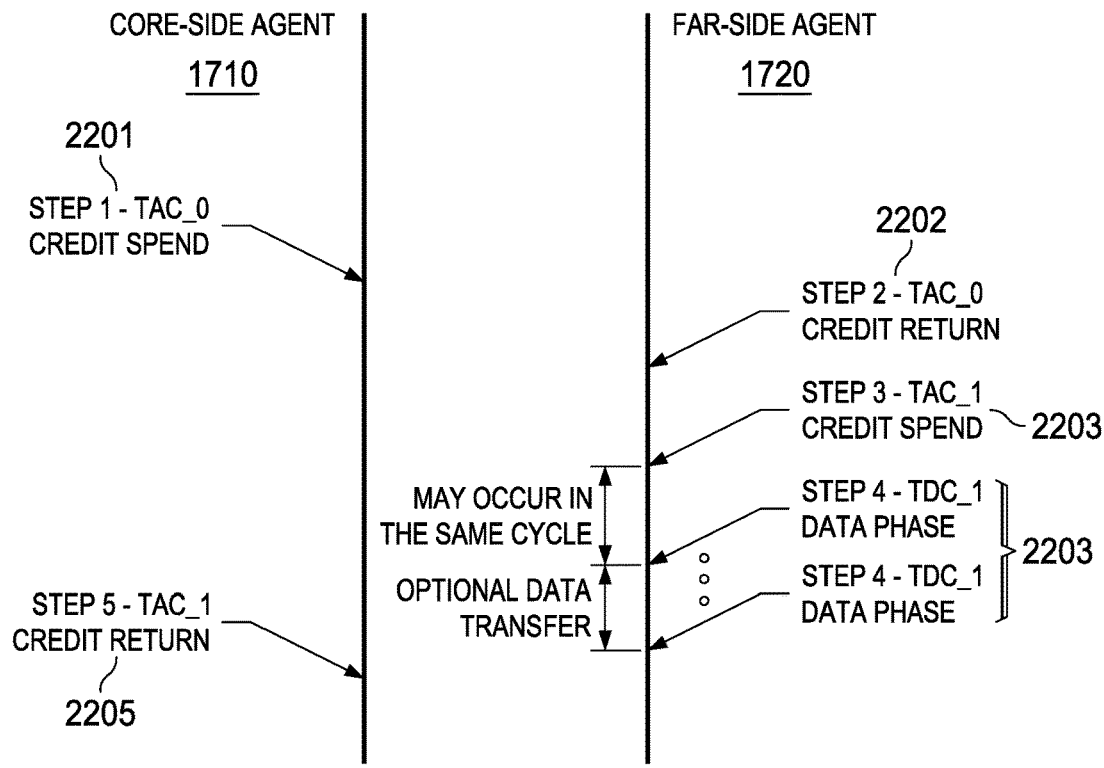
FIG. 22 illustrates the steps in a credit non-write sequence.

FIG. 22 illustrates the steps in a credit non-write sequence. Such a credit non-write sequence begins with core-side agent 1710 initialing a credit spend of type A0 (step 2201) on TAC 1712. At step 2202 far-side agent 1720 transmits a credit return of type A0 to core-side agent 1710 on TAC 1722. This occurs once far-side agent 1720 clears the physical resource occupied by the initial command transaction (step 2201). No transaction ID is associated with the credit return. At step 2203 far-side agent 1720 initiates a new response transaction, spending a single credit of credit type B1 on TAC 1722. The ID of this response transaction must match the original ID (step 2201). At step 2204 far-side agent 1720 performs an optional data transfer of one or more data phases on TDC 1723. No credits are required for this action, because the data transfer falls under the credit spend in step 2203. Because TAC 1722 and TDC 1723 are different channels, an initial phase of the data transfer on TDC 1723 may occur simultaneously with the credit spend in step 2203. FIG. 22 illustrates an example having multiple data transfers. In step 2205 core-side agent 1710 returns a single credit of the return credit type B to far-side agent 1720 on TAC 1712. This occurs once core-side 1710 clears the physical resource occupied by the return transaction (step 2203). No transaction ID is associated with the credit-return.

There are five credited non-write sequence types: read operation; snoop operation; message sequence; and maintenance sequence. Table 21 lists the legal transaction types and data transfers for the steps illustrated in FIG. 17 in a Paired Interface Topology.

TABLE 21

| | Read Sequence | Snoop Sequence | Message Sequence | Maintenance Sequence |
|---|---|---|---|---|
| Step 1 | ReadNoSnoop ReadOnce ReadClean ReadUnique | SnoopReadOnce SnoopReadShared SnoopCleanShared SnoopCleanInvalid SnoopMakeInvalid | CacheWarm CacheWarmNotify Evict | CleanSharedPOU CleanInvalidPOU MakeInvalidPOU CleanSharedPOC CleanInvalidPOC MakeInvalidPOC |
| Step 2 | Required | Required | Required | Required |
| Step 3 | ReadResponse | SnoopResponse | MessageResponse | MaintenanceResponse |
| Step 4 | Required if cstatus indicates success Optional if cstatus indicates failure | Optional depending on snoop transaction and presence of snooped line in cache | Not Allowed | Not Allowed |
| Step 5 | Required | Required | Required | Required |

Figure 23:
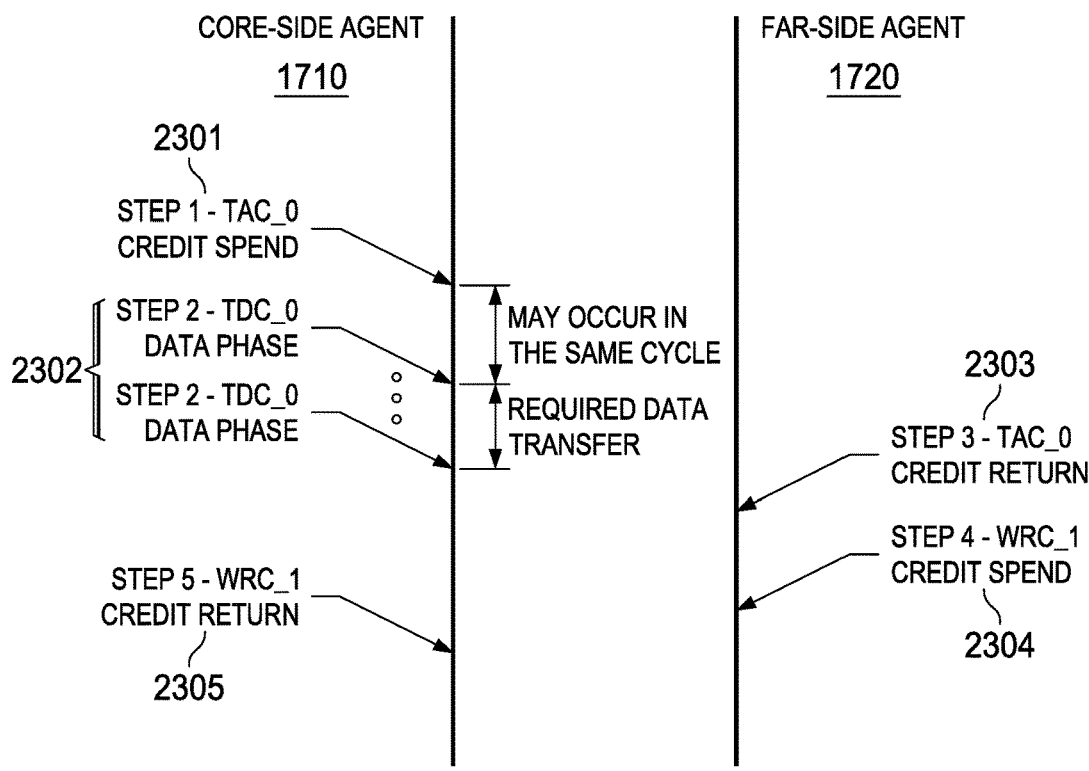
FIG. 23 illustrates the general form of a credited write command sequence.

FIG. 23 illustrates the general form of a credited write command sequence. The credited write sequence is differentiated from a credited non-write sequence described above by the manner in which the sequence is completed. Credited write sequences are completed with a write status on the Write Response Channel (WRC). The transaction ID and credit types are shown using arbitrary symbolic names to illustrate the nature of credit and ID flow throughout the sequence, and otherwise do not carry any significance within the MBA interface or protocol.

The credited write sequence is begun at step 2301 with core-side agent 1710 spending a single credit of type A5 on TAC 1711. This differs from credit type A0 of step 2201 of FIG. 22 because core-side 1710 must ensure that far-side agent 1720 can handle the data of the write. Thus a different credit type is required. In step 2301 core-side agent 1710 performs a data transfer of one or more data phases on TDC 1712 for the write command transaction. No credits are required for this action. This data transfer falls under the credit spend in step 2301. Because TAC 1711 and TDC 1712 are different channels, an initial phase of the data transfer on TDC 1712 may occur simultaneously with the credit spend in step 2201. FIG. 22 illustrates an example having multiple data transfers. In step 2303 far-side agent 1720 returns a single credit of type A5 back to core-side agent 1710 on TAC 1722. This occurs once far-side agent 1720 clears the physical resource occupied by the command transaction (step 2301). No transaction ID is associated with the credit-return. In step 2304 far-side agent 1720 initiates a write response when processing of the write command transaction is complete on WRC 1724. The ID must match the original ID. The write response requires the spend of a dedicated write response credit type. In step 2304 core-side agent 1710 returns a single write response credit to far-side agent 1720 via WRC 1714. This occurs once the write response sent by far-side agent 1710 has been consumed by core-side agent 1710. No transaction ID or explicit credit type is associated with the write response credit-return.

The following are the steps of an example credited DVM Sequence. This example describes the behavior between a far-side agent acting as the interconnect and a core-side agent acting as a cache master. In this example core-side agent 1710/cache master is responding to a DVM-Operation that was initiated to the interconnect from another cache master in the system not described in the table. There are three parts of the DVM sequence: DVM operation; DVM sync; and DVM complete.

The DVM operation begins with far-side agent 1720 initiating a new DVM-Operation command transaction sequence. This includes spending a single credit of an appropriate type. Core-side agent 1710 responds by returning a single credit of that type back to far-side agent 1720 once core-side agent 1720 clears the physical resource occupied by the command transaction. No transaction ID is associated with this credit return. Core-side agent 1710 then initiates a message response as credited transaction to far-side agent 1710 to confirm receipt of the DVM-Operation. Core-side agent 1710 uses the ID from the original DVM-Operation. Far-side agent 1710 returns a single credit matching the type used by the message response. No transaction ID is associated with the credit-return.

Far-side agent 1720 then initiates a new DVM-Sync command transaction sequence, spending an appropriate single credit. In this example, all DVM transactions from the same master use the same credit type. Core-side agent 1710 returns a single credit of the corresponding type A6 to far-side agent 1720. This occurs once core-side agent 1710 has cleared the physical resource occupied by the command transaction. No transaction ID is associated with the credit-return. Next core-side agent 1710 initiates a message response in a credited transaction to far-side agent 1720 to confirm receipt of the DVM-Sync. Core-side agent 1710 uses the ID from the original DVM-Sync transaction. Far-side agent 1720 returns a single credit type matching the type used by the message response. No transaction ID is associated with this credit-return.

Core-side agent 1710 initiates a new DVM-Complete command transaction sequence, spending a single credit of an appropriate type. Far-side agent 1720 returns a single credit of that type back to core-side agent 1710. This occurs once far-side agent 1720 clears the physical resource occupied by the command transaction. No transaction ID is associated with the credit-return. Far-side agent 1720 initiates a Message Response credited transaction to Agent B to confirm receipt of the DVM-Complete. The ID from the original DVM-Sync is used. Core-side agent 1710 returns a single credit matching the type used by the message response. No transaction ID is associated with this credit-return.

Upon reset, the Credit-count for each Credit-type on an interface is reset to a Credit-limit tieoff value as determined by a static interface configuration. For each credit type this limit corresponds to the slave resources to service the corresponding transaction.

Transactions are ordered in the MBA protocol of this invention based on the following transaction properties: caddress[47:0]; cmstid[11:0]; and cid[11:0]. For MBA interfaces that exclude the optional cmstid signal, a constant cmstid is assumed for all transactions for the purposes of ordering rules. Transactions are defined as having overlapping addresses if the two transactions operate on one or more of the same bytes, as determined by caddress and cbytecnt. Credited non-write sequences between two agents are ordered as illustrated in FIG. 22. Credited write sequences between two agents are ordered as illustrated in FIG. 23.

Multiple sequences may be interleaved on the same MBA paired interface (FIG. 17). The ordering rules for a single sequence remain in effect and the sequence steps for the separate sequences may be interleaved in any order. If a master is sending multiple transactions that all include data transfers, the master may interleave data phases on the TDC between different transactions in any order as long as the single sequence rules are obeyed.

The ordering rules for master agents are summarized as follows. For any transaction that includes a data transfer, the first TDC data phase must not precede the TAC, though they may be initiated in the same cycle. All data phases in a data transfer must occur in monotonically increasing order based on address. The master may interleave the Transaction Data Channel (TDC) data phases in any order for transactions issued on the Transaction Attribute Channel (TAC), as long as the data phases within any single data transfer are initiated in monotonically increasing order based on address. A master must not initiate more than one command transaction on the same MBA interface with the same cmstid[11:0] and cid[11:0] combination until either a response transaction or a write status has been received for the prior cmstid/cid pair.

The ordering rules for slave agents are summarized as follows. The slave must complete all blocking transactions to overlapping addresses with the same cmstid in the order they were received, regardless of ccredit or cid. The slave must complete all non-blocking transactions to overlapping addresses with the same cmstid in the order they were received, regardless of ccredit or cid. If the slave receives a blocking transaction after receiving a NON-BLOCKING TRANSACTION to overlapping addresses with the same cmstid, the slave must complete the two transactions in the order in which they were received, regardless of ccredit or cid. A blocking transaction must not bypass a non-blocking transaction to an overlapping address with the same cmstid. If the slave receives a non-blocking transaction after receiving a blocking transaction to overlapping addresses with the same cmstid, the slave is not required to complete the transactions in the order they were received. A non-blocking transaction is allowed to bypass a blocking transaction to an overlapping address with the same cmstid. The slave may complete transactions with non-overlapping addresses in any order, regardless of ccredit, cmstid or cid.

Core-side agents must follow the following rule to guarantee correctness for transactions to sharable regions of memory. The core-side agent must maintain the order of snoop command transactions and read response transactions to overlapping addresses, regardless of ccredit, cmstid, or cid.

Far-side agent must follow the following rule to guarantee correctness for transactions to sharable regions of memory. If the far-side agent initiates a snoop command transaction to the core-side agent and subsequently receives a blocking command transaction with an overlapping address, the far-side agent must not process the blocking command transaction until it receives and processes a snoop response transaction from the core-side agent.

A master must not initiate more than one command transaction on the same MBA interface with the same cmstid[11:0] and cid[11:0] combination until either a response transaction or a write status has been received for the cmstid/cid pair.

The introduction of the Multicore Bus Architecture (MBA) protocol includes a novel technique of sharing the same physical channel for all transaction types, including all command flavors (read, write, coherence, message), as well as responses. Two channels, the Transaction Attribute Channel (TAC) and the Transaction Data Channel (TDC) are used to transmit all transaction attributes and data, regardless of transaction type. Only a single data bus is required, regardless of width for dataflow in a single direction, whether for write command, read response, coherence response, etc.

Figure 24:
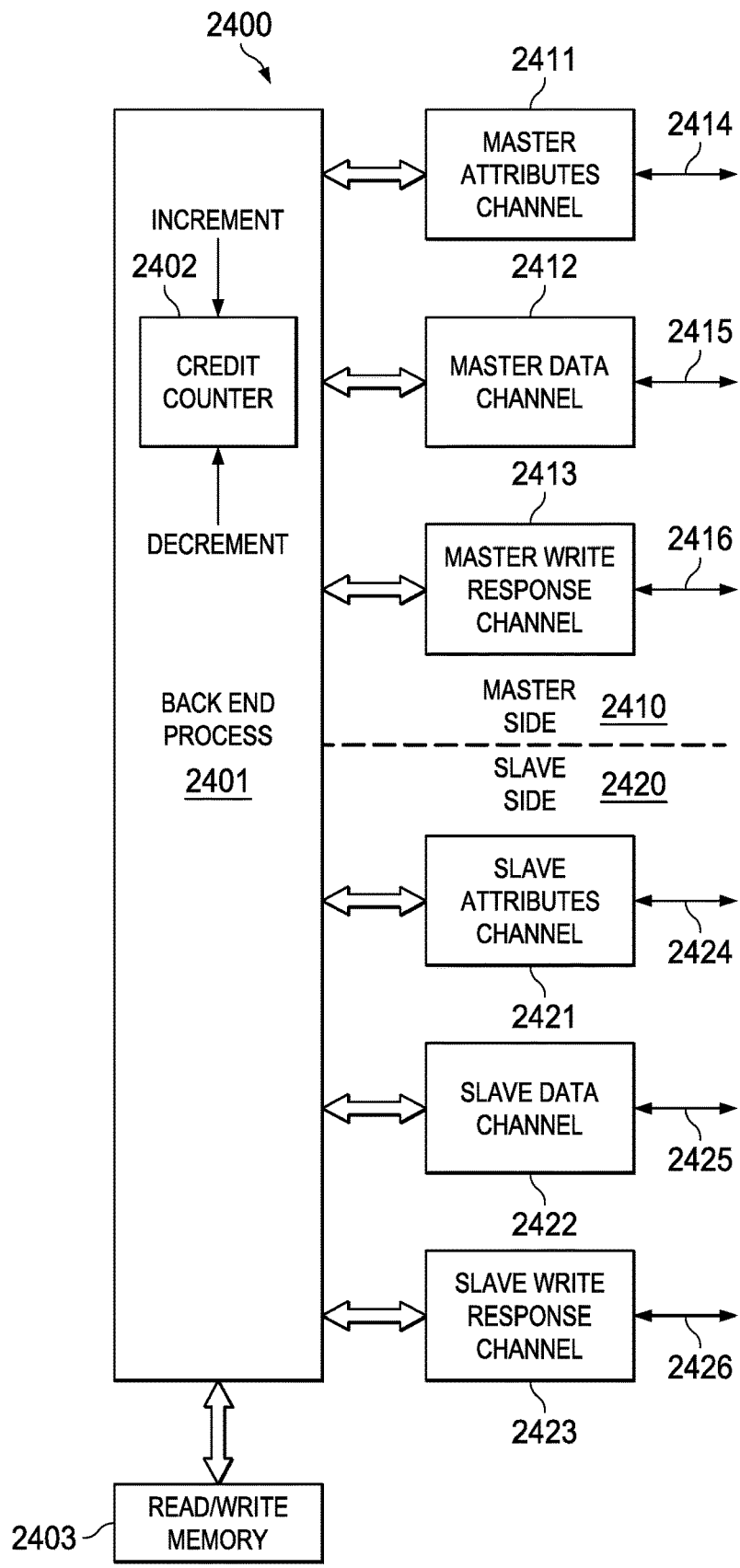
FIG. 24 illustrates a block diagram of an agent such as employed in this invention.

FIG. 24 illustrates a block diagram of an agent 2400 such as core-side agent 1710 or far-side agent 1720 illustrated in FIG. 17. FIG. 24 illustrates use of minimal signal wires in the MBA of this invention. Back end process 2401 represents all the circuits and systems for the agent. This might include a CPU with internal cache, a memory, a controllable peripheral and the like. In this example back end process 2401 handles bus protocol including tracking bus credits (incrementing and decrementing) stored in credit counter 2402 spent for outgoing transactions and credit returns.

FIG. 24 also illustrates read/write memory 2403 connected to back end process 2401. Read/write memory 2403 represents the type of controlled operation contemplated in this invention. In the example illustrated in FIG. 24, back end process 2401 may read from or write to read/write memory 2403 in accordance with bus transactions. Back end process 2401 may control unidirectional data flow such as to an output device or from an input device.

Back end process 2401 communicates via the previously described MBA including master side 2410 and slave side 2420 in this example. Other feasible configurations are further described below.

Master side 2410 includes master attribute channel 2411, master data channel 2412 and master write response channel 2413. Agent 2400 uses master attribute channel 2411 on all the signals such as cvalid, ccredit, cid, ctype and cdata listed in Table 5 above communicating via bus 2414. Agent 2400 uses master data channel 2412 on all the signals such as dvalid, did, dtype, dlast and ddata listed in Table 12 above communicating via bus 2415. Agent 2400 uses master write response channel 2413 on all signals such as wvalid, wid and wstatus listed in table 15 above communicating via bus 2416.

Slave side 2420 includes slave attribute channel 2421, slave data channel 2422 and slave write response channel 2423. Agent 2400 uses slave attribute channel 2421 on the creturn signal as listed in Table 5 above communicating via bus 2424. Agent 2400 uses slave data channel 2412 on all the signals such as dvalid, did, dtype, dlast and ddata listed in Table 12 above communicating via bus 2425. Agent 2400 uses slave write response channel 2423 on the wreturn signal as listed in table 15 above communicating via bus 2426.

FIG. 24 illustrates agent 2400 including all parts needed to operate as both a master and a slave device. In the MBA of this invention, an agent will often operate in both roles. For example, an agent communicating with an external memory agent will need to act as both a master and a slave. As a master such an agent needs to spend a credit to begin a read or write, supply the read or write beginning address and data length, supply the data if the transaction is a write and receive a credit return. As a slave such an agent needs to accept a credit, accept data supplied by the memory in response to a read transaction and return a credit. This example supposes two-way data flow. This example generally requires all the parts illustrated in FIG. 24.

There are other examples requiring less than all the parts of FIG. 24. Consider an agent coupled to a write-only peripheral such as an output device. Such an agent needs to spend a credit to begin a write, supply the write beginning address and data length if needed, supply the write data and receive a credit return. Such an agent may also generate a write response to the write-only peripheral. Such an agent would not need to be a slave device because the write-only peripheral would not return data and thus would not need to control a bus transaction. Such an agent would need master attribute channel 2411, master data channel 2412 and master write response channel 2423.

Consider another example of an agent coupled to a read-only peripheral such as an input device. Such an agent needs to spend a credit to begin a read and receive a credit return. Such an agent needs operate as a slave to accept a credit, accept data supplied by the memory in response to a read transaction and return a credit. Such an agent would need master attribute channel 2412, slave attribute channel 2421, slave data channel 2422 and slave write response channel 2423. This agent would not need master data channel 2412 or master write response channel 2413.

Other solutions may share a few signals between different command types (reads and writes may share address pins, for example). Typically these other solutions separate read and write data. This is the largest source of wire congestion at large data widths such as 512 bits and greater. The MBA protocol of this invention transmits all transactions across the same pins, regardless of transaction type, resulting a maximum sharing of wires and a minimum physical overhead.

The MBA protocol requires only two channels to send a transaction from master to slave. These are: the Transaction Attribute Channel (TAC); and the Transaction Data Channel (TDC). The TAC transmits all transaction attributes including address, memory attributes and transaction type. The TDC transmits data in one or more phases. Because all transaction types use the same two channels, this invention requires a minimum number of physical wires to transmit a full range of different transaction types.

The channel sharing provided by the MBA protocol results in a significant reduction in physical wire congestion for large interconnects and slave devices with multiple masters. This results in lower area and power, higher performance and shorter design cycles for physical closure.

What is claimed is:

1. A system comprising:
a first bus agent;
a second bus agent; and
a bus interface coupled between the first bus agent and the second bus agent that includes a credited attribute channel from the first bus agent to the second bus agent and a non-credited data channel from the first bus agent to the second bus agent, wherein:
the first bus agent includes a counter operable to track credits of the credited attribute channel, wherein the credits are associated with a plurality of credit types; and
the first bus agent is operable to:
determine, using the counter, whether the credited attribute channel has sufficient credits of a first credit type of the plurality of credit types corresponding to a first transaction type to perform a transaction; and
in response to the credited attribute channel having sufficient credits, perform the transaction by:
transferring an attribute of the transaction to the second bus agent over the credited attribute channel; and
transferring data of the transaction to the second bus agent over the non-credited data channel.

2. The system of claim 1, wherein:
the transaction is a first transaction; and
the first bus agent is operable to:
determine, using the counter, whether the credited attribute channel has sufficient credits of a second credit type that is different from the first credit type to perform a second transaction; and
in response to the credited attribute channel having sufficient credits of the second credit type, perform the second transaction by transferring the attribute to the second bus agent over the credited attribute channel such that the attribute corresponds to the first transaction and the second transaction.

3. The system of claim 2, wherein the attribute includes a bit vector that includes a first bit associated with the first credit type of the first transaction and a second bit associated with the second credit type of the second transaction.

4. The system of claim 1, wherein first bus agent is operable to transfer the attribute and the data during a clock cycle.

5. The system of claim 1, wherein first bus agent is operable to transfer the attribute during a first clock cycle and the data during a second clock cycle subsequent to the first clock cycle.

6. The system of claim 1, wherein:
the data is a first subset of data of the transaction;
the first subset of data is transferred during a first data phase; and
the first bus agent is operable to transfer a second subset of data of the transaction to the second bus agent over the non-credited data channel during a second data phase.

7. The system of claim 1, wherein the performing of the transaction consumes a credit of the first credit type.

8. The system of claim 1, wherein:
the credited attribute channel is a first credited attribute channel;
the bus interface includes a second credited attribute channel from the second bus agent to the first bus agent; and
the second bus agent is operable to return a credit of the first credit type to the first bus agent after the performing of the transaction.

9. The system of claim 1, wherein:
the bus interface includes a write return channel from the second bus agent to the first bus agent; and the second bus agent is operable to transmit a response to the transaction to the first bus agent over the write return channel.

10. The system of claim 9, wherein the response to the transaction includes a return of a credit of the first credit type to the first bus agent.

11. The system of claim 1, wherein the attribute includes an indication of the first credit type associated with the transaction.

12. The system of claim 1, wherein the first bus agent is operable to transfer the attribute over the credited attribute channel and to transfer the data over the non-credited data channel without receiving a response from the second bus agent.

13. The system of claim 1, wherein the attribute and the data each include an indication of an identifier of the transaction.

14. A processor comprising:
a first processing core;
a second processing core; and
a bus interface coupled to the first processing core and the second processing core that includes a credited attribute channel from the first processing core to the second processing core and a non-credited data channel from the first processing core to the second processing core, wherein:
the first processing core is operable to:
count a plurality of credit types of the credited attribute channel;
determine whether the credited attribute channel has sufficient credits of a first credit type of the plurality of credit types corresponding to a first transaction type to perform a transaction; and
in response to the credited attribute channel having sufficient credits:
transfer an attribute of the transaction to the second processing core over the credited attribute channel; and
transfer data of the transaction to the second processing core over the non-credited data channel.

15. The processor of claim 14, wherein:
the transaction is a first transaction; and
the first processing core is operable to:
determine whether the credited attribute channel has sufficient credits of a second credit type that is different from the first credit type to perform a second transaction; and
in response to the credited attribute channel having sufficient credits of the second credit type, perform the second transaction by transferring the attribute to the second processing core over the credited attribute channel such that the attribute corresponds to the first transaction and the second transaction.

16. The processor of claim 15, wherein the attribute includes a bit vector that includes a first bit associated with the first credit type of the first transaction and a second bit associated with the second credit type of the second transaction.

17. The processor of claim 14, wherein first processing core is operable to transfer the attribute and the data during a clock cycle.

18. The processor of claim 14, wherein first processing core is operable to transfer the attribute during a first clock cycle and the data during a second clock cycle subsequent to the first clock cycle.

19. The processor of claim 14, wherein:

the credited attribute channel is a first credited attribute channel;

the bus interface includes a second credited attribute channel from the second processing core to the first processing core; and the second processing core is operable to return a credit of the first credit type to the first processing core after the performing of the transaction.

20. The processor of claim 14, wherein:

the bus interface includes a write return channel from the second processing core to the first processing core;

the second processing core is operable to transmit a response to the transaction to the first processing core over the write return channel; and the response to the transaction includes a return of a credit of the first credit type to the first processing core.

\* \* \* \* \*